United States Patent
Kapur et al.

(10) Patent No.: US 7,964,049 B2
(45) Date of Patent: Jun. 21, 2011

(54) PROCESSES FOR MAKING FIBER-ON-END MATERIALS

(75) Inventors: Vivek Kapur, Kennett Square, PA (US); Joseph Anthony Perrotto, Landenberg, PA (US); Harry Vaughn Samuelson, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 897 days.

(21) Appl. No.: 11/828,606

(22) Filed: Jul. 26, 2007

(65) Prior Publication Data

US 2008/0023125 A1    Jan. 31, 2008

Related U.S. Application Data

(60) Provisional application No. 60/837,389, filed on Jul. 28, 2006.

(51) Int. Cl.
 *B65H 81/00* (2006.01)
(52) U.S. Cl. ........ 156/174; 156/169; 156/173; 156/175; 156/256; 156/264
(58) Field of Classification Search .................. 156/169, 156/174, 173, 175, 256, 264
See application file for complete search history.

(56) References Cited

U.S. PATENT DOCUMENTS

| | | | |
|---|---|---|---|
| 2,936,482 A | 6/1955 | Kilian | |
| 3,085,922 A | 4/1963 | Koller | |
| 3,174,451 A | 3/1965 | Heiks | |
| 3,293,104 A | 12/1966 | Hull | |
| 3,468,975 A | 9/1969 | Duxbury et al. | |
| 3,493,452 A | 2/1970 | Cole | |
| 3,913,666 A * | 10/1975 | Bayliss | 165/104.15 |
| 4,230,838 A | 10/1980 | Foy et al. | |
| 4,346,006 A | 8/1982 | Kopp et al. | |
| 4,381,335 A | 4/1983 | Okamoto | |
| 4,911,846 A * | 3/1990 | Akasu et al. | 210/645 |
| 5,126,053 A * | 6/1992 | Schneider et al. | 210/640 |
| 5,439,626 A | 8/1995 | Bennett et al. | |
| 2002/0164824 A1 | 11/2002 | Xiao et al. | |
| 2004/0020845 A1 | 2/2004 | Susuki et al. | |
| 2005/0249917 A1 | 11/2005 | Trentacosta et al. | |
| 2006/0280906 A1 | 12/2006 | Trentacosta et al. | |
| 2008/0023015 A1 | 1/2008 | Arnold et al. | |

FOREIGN PATENT DOCUMENTS

| | | |
|---|---|---|
| EP | 0 167 094 A1 | 1/1986 |
| EP | 0 195 860 A1 | 10/1986 |
| EP | 1616985 A1 | 1/2006 |
| GB | 2105247 * | 3/1983 |
| JP | 63-59311 A * | 3/1988 |
| JP | 8-226060 A | 9/1996 |
| JP | 9187602 A | 7/1997 |
| JP | 9-267009 A | 10/1997 |
| JP | 10-314553 A * | 12/1998 |
| WO | WO2005024100 A2 | 3/2005 |

OTHER PUBLICATIONS

U.S. Appl. No. 11/584,927, filed Oct. 23, 2006, Kapur et al.

(Continued)

*Primary Examiner* — Jeff H Aftergut

(57) ABSTRACT

Processes for making fiber-on-end materials are provided. The materials can be used to make a variety of finished articles.

16 Claims, 11 Drawing Sheets

OTHER PUBLICATIONS

U.S. Appl. No. 11/584,999, filed Oct. 23, 2006, Kapur et al.

Fourne, "Synthetic Fibers" (Carl Hanser Verlag, 1999), Translated and Edited by H. A. Hergeth & R. Means, pp. 539-548.

Fourne, "Synthetic Fibers" (Carl Hanser Verlag, 1999), Translated and Edited by H. A. Hergeth & R. Means, pp. 717-720.

Moch, Jr., "Hollow-Fiber Membranes", Kirk-Othmer Encyclopedia of Chemical Technology, $4^{th}$ Edition, vol. 13, pp. 312-337 (John Wiley & Sons, 1996).

Ghosh, "Protein separation using membrane chromatography: opportunities and challenges", J. ofChromatography A, 952 (2002), pp. 13-27.

Office Action mailed Mar. 3, 2010, in co-pending U.S. Appl. No. 11/828,629.

Office Action mailed Sep. 2, 2010, in co-pending U.S. Appl. No. 11/828,629.

* cited by examiner

Side View

Top View

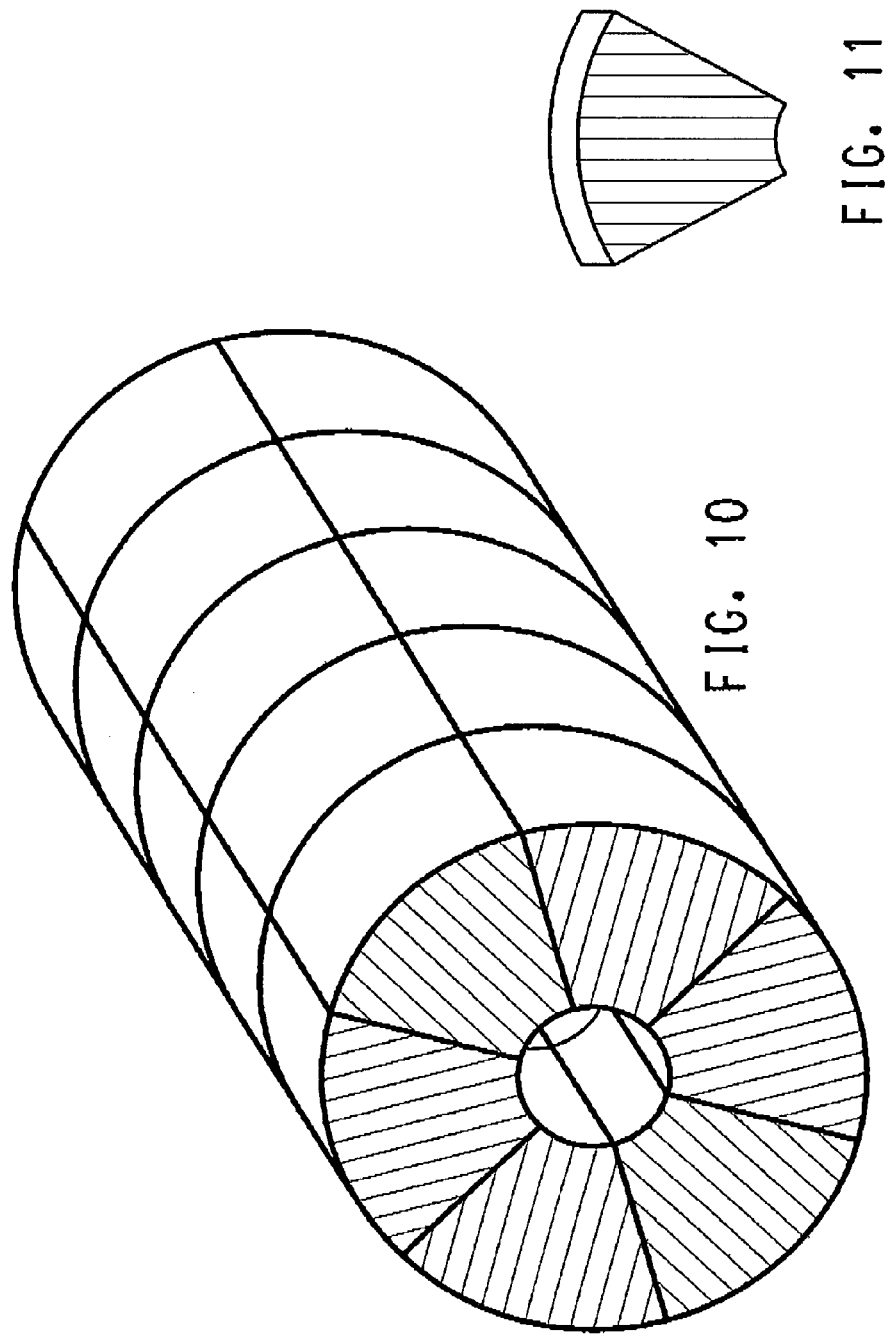

US 7,964,049 B2

PROCESSES FOR MAKING FIBER-ON-END MATERIALS

This application claims the benefit of U.S. Provisional Application No. 60/837,389, filed Jul. 28, 2006, which is incorporated in its entirety as a part hereof for all purposes.

STATEMENT OF GOVERNMENT RIGHTS

This invention was made with United States government support under Contract No. DAAD19-02-D-0002, awarded by the Department of the Army, U.S. Army Research Laboratory. The United States government has certain rights in this invention.

FIELD OF THE INVENTION

The present invention is directed to processes for making fiber-on-end materials.

BACKGROUND

Microporous membranes are prevalent in the chemical, food, pharmaceutical and medical industries where they are used to separate desired and undesired components of process streams, for example, to remove impurities by filtration or to separate and retain precious or useful particulate species. Microporous membranes are also used in custom apparel such as outerwear, where they provide breathability and yet protect the wearer from the elements such as wind and rain. They are also used in the fabrication of protective masks and apparel to help exclude toxic particulate species such as carcinogenic aerosols, spores and bacteria. In all of the aforementioned applications, performance is greatly limited by the largest pores in the membrane because the largest pore controls the size of the particulate that can be excluded and the majority of flow is relegated to the larger pores, such that the smaller pores may give a higher porosity number to the membrane but contribute little to overall flux. Hence, it is desirable to be able to produce porous membranes with little or no variation in pore size.

Uniform pores in planar films can be created by many different fabrication techniques. For example, uniform capillary pores can be created by ion bombardment and track-etched processes. They can also be created using laser ablation, ion beam etching or optical lithography. But all these micro-fabrication processes are limited by one or more of a variety of factors such as cost, a limited number of suitable material substrates, the inability to create large-area membranes, and low porosity.

Membranes without the open pores above are used to separate chemical species by permitting diffusion of some and not others. Life itself is sustained by selective diffusion through cellular lipid membranes, desalination is used worldwide to make fresh or potable water from sea or brackish water; likewise, gas purification, kidney dialysis and many other chemical separations are known as entropic driven processes. Many materials that have high selectivity that could be used as membranes are not used as the materials themselves have poor physical properties that make them impractical to use as a large area membrane of commercial value.

Membranes and sheet structures can also be created from a "fiber-on-end" (FOE) process wherein multicomponent fibers with microfeatures are assembled in a preferred direction and then consolidated or sintered together to create a defect-free structure. When this solid structure is cut or sectioned in a direction that is perpendicular to the orientation of the fibers, membranes and sheets with microfeatures are created. Fiber-on-end arrangements have been found to have useful properties for membranes and capillary arrays. Hand lay-up of such materials is possible, but not practical for commercial manufacturing.

One method of making the fiber-on-end materials is to arrange pre-cut thermoplastic fiber lengths into a cavity of a press die. The die is closed and heat and pressure are applied, so that the walls of the fibers soften and fuse together. The amount of pressure and heat applied will depend on the composition and structure of the fibers. If too much pressure is applied, hollow fibers could collapse or the cores of sheath-core fibers could be distorted. If insufficient pressure is applied, the fibers may fuse only partially, leaving behind voids and defects. It is also desired to apply enough pressure to allow the fibers near the center to be compressed, yet avoid crushing fibers near the outside. Heat is also applied externally and transfers through the mass of fibers to the reach the center. Careful application of heat and a sufficient rate of heat transfer can allow one to avoid degrading, distorting or melting the cores of the outermost fibers while still allowing the fibers located near the center to fuse.

Similar care is taken when making fiber-on-end materials using binders or solvents. Sufficient time is needed for the binder or solvents to diffuse into the surface and if appropriate evaporate. If a heat-activated binder is used, the rate of heat transfer can be limiting, and, care is taken to ensure that the inner most fibers before the outer fibers are cured.

It can be seen that making fiber-on-end materials with large dimensions by this method is limited by heat transfer rates and would likely require careful control and choice of time and temperature.

In European Patent Applications 195860A1 and 167094A1, parallel fibers are consolidated by winding the fibers on a drum and then bonding or thermally fusing them into a solid that is later skived in a direction perpendicular to the parallel fibers. The fibers, having been arranged concentric to the surface of the winding drum, must be sliced in a radial direction with respect to their winding orientation. This is accomplished by cutting off the consolidated fiber layer, pressing it flat, cutting sections of the flattened layer, reorienting the sections by ninety degrees, fusing the sections together into a block, cutting the blocks again into trapezoids, arranging the trapezoids around the periphery of a support drum and skiving a layer, perpendicular to the fiber axis, to form a membrane. In EP0167094, a solid cylinder of sea polymer is made at a temperature above the sea melting point, then cut axially into four segments which are pressed flat prior to making thin cuts into this flattened segment. This pressing flat of a thick fused polymer block, which is reinforced with small polymer cores, places high extensional stress on those cores on the smaller inside curvature of the quartered section and high compressional stress on cores nearer the outside larger curvature. This could impose high distortion to the cores and give non-uniform capillary structures. The method in EP195860A1 and EP167094A1 requires multiple handling steps and is not readily adaptable for large-scale, continuous or potentially automated operation. Heat transfer rates also limit how quickly each fusing step can be accomplished with thermoplastic or reactive bonding agents. These features limit the productivity of these methods and practical membrane size.

There thus remains a need for a process capable of making fiber-on-end materials of large planar dimensions, e.g., one meter wide or more, in an at least partly continuous or automated manner.

SUMMARY OF THE INVENTION

One aspect of the present invention is a process for manufacturing fiber-on-end material, comprising:
 a. arranging a plurality of fibers parallel to each other,
 b. continuously fusing or binding the fibers into a ribbon or fabric while maintaining the fibers parallel to each other,
 c. continuously folding or pleating the ribbon or fabric,
 d. compressing and fusing the folded or pleated ribbon or fabric into a solid, and
 e. skiving fiber-on-end material of a desired thickness from the solid.

Another aspect of the present invention is a process for manufacturing fiber-on-end material, comprising:
 a. arranging a plurality of fibers parallel to each other,
 b. winding the fibers onto a rotating roll,
 c. rotating the roll for a time sufficient to accumulate a desired thickness of fiber material,
 d. heating the accumulated fiber material to at least partially fuse its fibers to each other
 e. allowing the at least partially fused fiber material to cool to ambient temperature,
 f. slitting the at least partially fused fiber material,
 g. removing the slit material from the cooled roll,
 h. flattening it to form a ribbon, or mat,
 i. optionally, repeating steps a through h to form additional ribbons or mats,
 j. forming a stack comprising the ribbons or sections cut from one or more ribbons or mats,
 k. compressing and fusing the stack into a solid, and
 l. skiving fiber-on-end material of a desired thickness from the solid.

A further aspect of the invention is a process for preparing fiber-on-end material, comprising:
 a. providing a shaped billet comprising fused or partially fused fibers on end,
 b. cutting trapezoidal sections from the billet such that the fibers are oriented substantially perpendicular to the base of the trapezoidal section,
 c. welding the trapezoidal sections together to form a billet that is two concentric polygons in cross-section,
 d. mounting the billet formed in step c on a spindle,
 e. continuously rotating the billet, and
 f. skiving fiber-on-end material of a desired thickness from the continuously rotating billet.

A further aspect of the invention is a process for preparing porous membranes and capillary arrays, comprising:
 a. providing a shaped billet comprising fused or partially fused, fibers on end,
 b. cutting annular sectors from the billet such that the fibers are oriented substantially perpendicular to the outer arc of the annular sector,
 c. welding the annular sectors together to form a cylindrical billet that is two concentric circles in cross-section,
 d. mounting the billet formed in step c on a spindle,
 e. continuously rotating the billet, and
 f. skiving fiber-on-end material of a desired thickness from the continuously rotating billet.

BRIEF DESCRIPTION OF THE DRAWINGS

FIG. 10 is a schematic drawing of a cylindrical billet for skiving made from stacked fused fiber mats with solid capping films in two directions [end caps on front and back not shown]. Also shown are solid capping films between the wafers around, across and through the billet.

FIG. 11 is a schematic drawing of an annular sector of fused fibers that is one segment of the many that are stacked to make the billet shown in FIG. 10.

DETAILED DESCRIPTION

Figure 1:
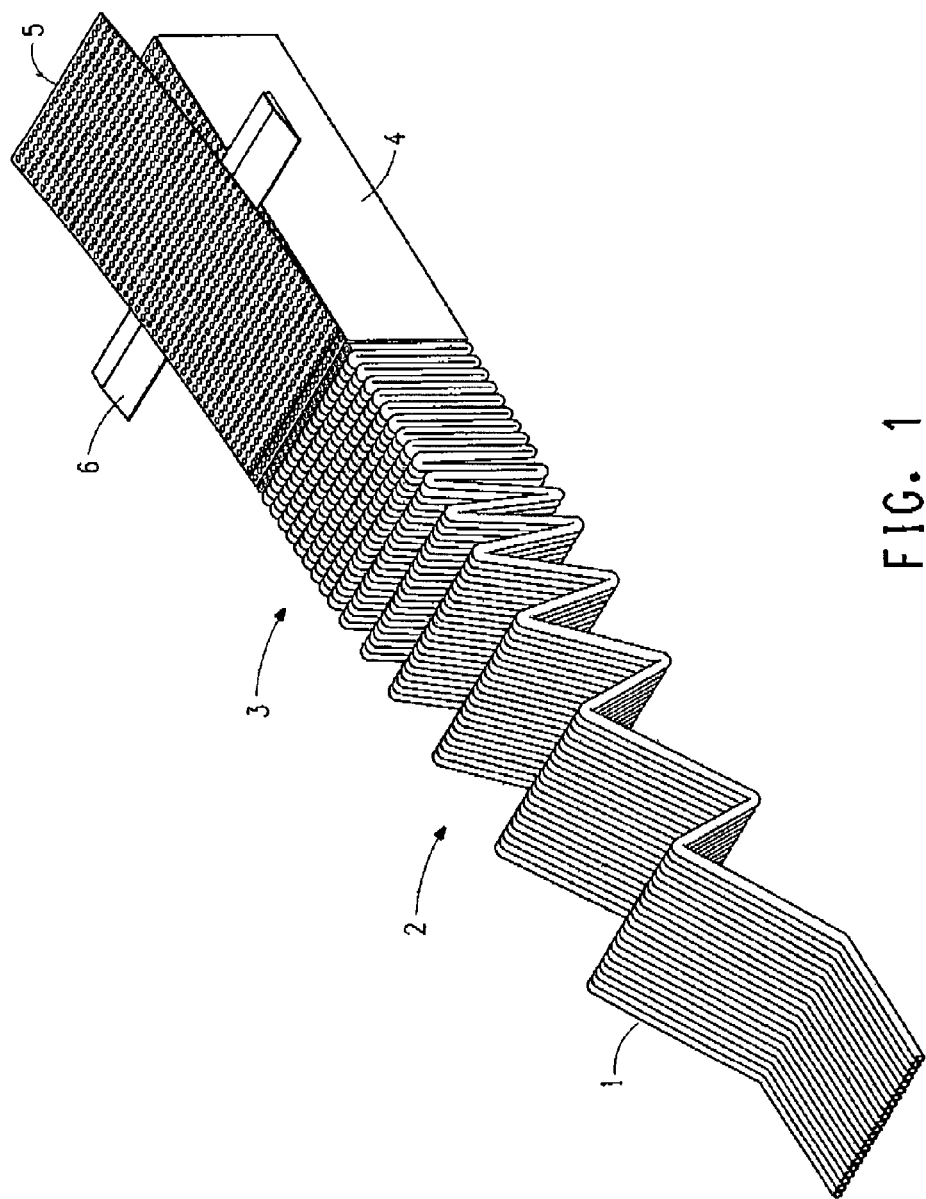
FIG. 1 is a schematic drawing of one embodiment of the invention, illustrating the pleating, fusion, and skiving processes.

The term "fiber-on-end" (FOE) as used herein refers to an arrangement of fibers substantially all of which are parallel to a common axis and perpendicular to an optional processing means. In one embodiment of the present invention, a plurality of fibers is arranged parallel to each other and formed into a fabric or ribbon, which retains the parallel fiber orientation. The fabric or ribbon is pleated and fused to form a solid block of material, or "billet." As used herein, the term "billet" refers to a semifinished solid material comprising fused fibers. The fibers may be bound together by thermal fusing of the fibers, by coating the fibers with a binder or by solvent bonding. As used herein, the term "fiber" means any material with slender, elongated structure such as polymer or natural fibers. A fiber is generally characterized by having a length at least 100 times its diameter or width. As used herein, the term "filament" means a fiber of an indefinite or extreme length such as found naturally in silk. As used herein, the term "yarn" is a generic term for a continuous strand of textile fibers, filaments, or material in a form suitable for knitting, weaving, or otherwise intertwining to form a textile fabric The fused solid formed from "fibers on end" is further processed by removing a thin layer, typically though not necessarily perpendicular to the fiber orientation, with a sharp blade thus forming a membrane. This process is known as "skiving". The term "membrane" as used herein is a discrete, thin structure that can moderate the transport of species in contact with it, such as gas, vapor, aerosol, liquid and/or particulates. Thicker sections may be desired to replicate the thickness of films and their distinctive end-uses, and still thicker may be desired to replicate, for example, leather or slit leather uses; cut into cubes, for example, such articles can be used as tablets that could contain materials such as pharmaceuticals. A porous membrane can be formed by using hollow fibers or multicomponent fibers in which a component is dissolved away after the membrane is skived from the billet. As used herein, the term "multicomponent fiber" denotes fibers containing two or more components (bicomponent, tricomponent, and so on). The term "porous membrane" as used herein denotes a membrane containing openings (pores) that may or may not completely traverse the membrane. The term "capillary array" as used herein denotes a membrane or sheet in which pores can be partially or completely filled with other species, for this invention.

The processes herein can be carried out continuously or partly continuously. One example of a continuous process is shown schematically in FIG. 1, which allows the continuous production of large-area membranes without the heat transfer constraints of the methods in the prior art. Various methods of billet preparation are described below. If desired, a billet can be prepared and then set aside for later skiving.

Membranes and capillary arrays can be prepared by skiving layers from a fused block and, optionally, dissolving one or more fiber components. The direction of the skiving is typically essentially perpendicular to the fiber axis, although some applications may require a cut at some angle to the capillary axis, Fibers Fibers suitable for use in the embodiments of the invention can be made by any of various methods known in the art. Depending on the particular polymer(s) used, fibers can be spun from solution (for example, polyureas, polyurethanes) or from a melt (for example, polyolefin, polyamide, polyester). Materials, equipment, principles, and processes concerning the production of fibers are discussed in detail in Fourné, F., *Synthetic Fibers*, (Carl Hanser Verlag, 1999), translated and edited by H. H. A. Hergeth and R. Mears.

Hollow fibers are well known; their manufacture and applications are discussed in, for example, Fourné, p. 549 and by Irving Moch, Jr. in "Hollow Fiber Membranes," *Kirk-Othmer Encyclopedia of Chemical Technology*, $4^{th}$ edition, Volume 13, pages 312-337 (John Wiley & Sons, 1996).

The production of bi- and multicomponent fibers (for example, "islands in the sea" and sheath-core fibers) is discussed in, for example, Fourné, pp. 539-548 and 717-720. The term "islands in the sea" as used herein denotes a type of bicomponent or multicomponent fiber also described as multiple interface or filament-in-matrix. The "islands" are cores or fibrils of finite length, of one or more polymers imbedded in a "sea" (or matrix) consisting of another polymer. The matrix is often dissolved away to leave filaments of very low denier per filament. Conversely, the islands can be dissolved away to leave a hollow fiber. The term "sheath-core" as used herein denotes a bi- or multicomponent fiber of two polymer types or two or more variants of the same polymer. In a bicomponent sheath-core fiber, one polymer forms a core and the other surrounds it as a sheath. Multicomponent sheath-core type fibers or two or more polymers can also be made, containing a core, one or more inner sheaths, and an outer sheath. When the core is made as a hollow, more than one hollow may be present and more than one sheath may surround the hollow. Hollows may also have various shapes.

Many polymer materials can be used to create fiber-on-end membranes by the processes described herein. The appropriate choice of polymer materials will depend on several factors. One factor is the consolidation process and conditions for binding the fibers into a defect-free FOE billet. If elevated pressures and temperatures are to be used to sinter the neighboring fibers in a FOE bundle, then the polymer that makes up the outermost sheath or sea in a multicomponent fiber preferably has a melting point or softening point that is lower than the melting point of the polymer(s) that make(s) up the inner sheath, core or islands in the fiber. It may also be desirable that the glass transition temperature or the softening point or the heat deflection temperature of the inner sheath, core or island be higher than the melting point or the softening point of the outer sheath polymer or the sea polymer.

If one of the polymer components is later to be dissolved away to produce pores, then such a component should be readily soluble in a solvent. It is also desirable that the other polymer components or phases in the fiber are resistant to or insoluble in the solvent used to dissolve the soluble polymer component. Examples of soluble polymers and the solvents in which they are soluble include, but are not limited to, polyamides in formic acid, polyesters in strong alkali solutions, polyurethanes in polar solvents such as dimethylacetamide, polystyrene and its copolymers in aromatic solvents such as toluene and nonpolar solvents such as dichloromethane, and polyvinyl alcohol and some polyethers and polyether copolymers in water. Those skilled in the art know that certain polymers, although not soluble in pure solvents, are soluble in mixed solvents. These polymers may also be used as the soluble component in the multicomponent fibers used to create membranes made by the processes described herein.

Mechanical properties must also be considered when choosing polymer components. Enough mechanical flexibility is required for the fibers to survive being folded during the pleating process. When the fibers have been fused into a billet, the materials must be amenable to skiving by one or several skiving operations known to those skilled in the art.

The selection of the polymer components comprising the fiber will be determined in part by the end use of the FOE material created from the fiber. For example, if the fiber-on-end membranes produced by the processes described herein are to be used in the fabrication of chemical and biological protective garments, then the polymer components of the fiber should be intrinsically resistant and impermeable to toxic chemical and biological agents. If the membranes are to be used for filtration or purification of process streams in the chemical, biochemical or pharmaceutical industries, then the polymer components of the fiber are desirably resistant to the different species present in the process streams. If the fiber-on-end membranes are used to create one or more hydrophobic but breathable layers in firefighter's turnout coat, then it may be desirable to select polymer components that have intrinsic hydrophobic properties as well as fire resistant properties. It is expected that there will be several other applications for the FOE membranes created by the processes described herein. Hence, polymer components of the precursor multicomponent fiber may be selected to provide the desired properties that are needed for that specific application.

Those skilled in the art will know that the multicomponent fibers may be spun from a wide variety of polymer materials. Examples of classes of suitable polymer materials include, but are not limited to, homopolymers, copolymers and blends of: polyolefins, polyesters, polyamides, polyurethanes, polyethers, polysulfones, vinyl polymers, polystyrenes, polysilanes and polysulfides and fluorinated polymers. The copolymers within each class or between each class of aforementioned polymers can be random copolymers or block copolymers. Specific examples of polyolefins include, but are not limited to, stereospecific and random homopolymers of ethylene and propylene; and their copolymers with butene, isobutylene, octene, tetrafluoroethylene, hexafluoropropylene, tetrafluoroethylene, methacrylic acid, acrylic acid, vinyl acetate, vinyl alcohol, and vinyl chloride, methyl acrylate, ethyl acrylate, butyl acrylate or maleic anhydride. Ionomers derived from polyolefin copolymers, such as DuPont™ Surlyn® ionomer resins (E. I. du Pont de Nemours & Company, Inc., Wilmington, Del., USA), can also be used as a component in the multicomponent fiber. Specific examples of fluorinated polymers include, but are not limited to, homopolymers and copolymers of vinyl fluoride, vinylidene fluoride, tetrafluoroethylene, perfluoropropyl vinyl ether, and hexafluoropropylene. Specific examples of polyamides (PA) include, but are not limited to, homopolymers and copolymers of PA-6, PA-66, PA-610, PA-611, PA-612 and PA-1212 and their N-alkylated analogs. Polyamides obtained from aromatic dicarboxylic acids such as terephthalic acid and isophthalic acid and those obtained from aromatic diamines such as meta-xylene diamine and para-xylene diamine may be also be used for multicomponent fiber formation. Specific examples of styrenic polymers include, but are not limited to, polystyrene, copolymer of styrene and 1,2 butadiene and 1,4 butadiene, isoprene, and isobutylene. These copolymers can be completely saturated, partially saturated on unsaturated. Partial or complete saturation is achieved by reduction of the double bonds in the polymer. Ionomers (e.g., from acids) and ionomer salts of styrenic materials are further examples.

Useful thermoplastic polyurethane elastomers that could be used to make fibers and then membranes include those prepared from a polymeric glycol, a diisocyanate, and at least one diol or diamine chain extender. Diol chain extenders are preferred because the polyurethanes made therewith have lower melting points than if a diamine chain extender were used. Polymeric glycols useful in the preparation of the elastomeric polyurethanes include polyether glycols, polyester glycols, polycarbonate glycols and copolymers thereof. Examples of such glycols include poly(ethylene ether)glycol, poly(triethylene ether)glycol, poly(tetramethylene ether)glycol, poly(tetramethylene-co-2-methyl-tetramethylene ether) glycol, poly(ethylene-co-1,4-butylene adipate)glycol, poly (ethylene-co-1,2-propylene adipate)glycol, poly (hexamethylene-co-2,2-dimethyl-1,3-propylene adipate), poly(3-methyl-1,5-pentylene adipate)glycol, poly(3-methyl-1,5-pentylene nonanoate)glycol, poly(2,2-dimethyl-1,3-propylene dodecanoate)glycol, poly(pentane-1,5-carbonate)glycol, and poly(hexane-1,6-carbonate)glycol. Useful diisocyanates include 1-isocyanato-4-[(4-isocyanatophenyl) methyl]benzene, 1-isocyanato-2-[(4-isocyanato-phenyl)methyl]benzene, isophorone diisocyanate, 1,6-hexanediisocyanate, 2,2-bis(4-isocyanatophenyl)propane, 1,4-bis(p-isocyanato,alpha,alpha-dimethylbenzyl)benzene, 1,1'-methylenebis(4-isocyanatocyclohexane), and 2,4-tolylene diisocyanate. Useful diol chain extenders include ethylene glycol, 1,3 propane diol, 1,4-butanediol, 2,2-dimethyl-1,3-propylene diol, diethylene glycol, and mixtures thereof. Preferred polymeric glycols are poly(triethylene ether)glycol, poly(tetramethylene ether)glycol, poly(tetramethylene-co-2-methyl-tetramethyleneether)glycol, poly(ethylene-co-1,4-butylene adipate)glycol, and poly(2,2-dimethyl-1,3-propylene dodecanoate)glycol. 1-Isocyanato-4-[(4-isocyanatophenyl)methyl]benzene is a preferred diisocyanate. Preferred diol chain extenders are 1,3 propane diol and 1,4-butanediol. Monofunctional chain terminators such as 1-butanol and the like can be added to control the molecular weight of the polymer.

Useful thermoplastic polyester elastomers include the polyetheresters made by the reaction of a polyether glycol with a low-molecular weight diol, for example, a molecular weight of less than about 250, and a dicarboxylic acid or diester thereof, for example, terephthalic acid or dimethyl terephthalate. Useful polyether glycols include poly(ethylene ether)glycol, poly(triethylene ether)glycol, poly(tetramethylene ether)glycol, poly(tetramethylene-co-2-methyltetramethylene ether)glycol [derived from the copolymerization of tetrahydrofuran and 3-methyltetrahydrofuran] and poly(ethylene-co-tetramethyleneether)glycol. Useful low-molecular weight diols include ethylene glycol, 1,3 propane diol, 1,4-butanediol, 2,2-dimethyl-1,3-propylene diol, and mixtures thereof; 1,3 propane diol and 1,4-butanediol are preferred. Useful dicarboxylic acids include terephthalic acid, optionally with minor amounts of isophthalic acid, and diesters thereof (e.g., <20 mol %).

Useful thermoplastic polyesteramide elastomers that can be used in forming the fibers and membranes include those described in U.S. Pat. No. 3,468,975. For example, such elastomers can be prepared with polyester segments made by the reaction of ethylene glycol, 1,2-propanediol, 1,3-propanediol, 1,4-butanediol, 2,2-dimethyl-1,3-propanediol, 1,5-pentanediol, 1,6-hexanediol, 1,10-decandiol, 1,4-di(methylol)cyclohexane, diethylene glycol, or triethylene glycol with malonic acid, succinic acid, glutaric acid, adipic acid, 2-methyladipic acid, 3-methyladipic acid, 3,4-dimethyladipic acid, pimelic acid, suberic acid, azelaic acid, sebacic acid, or dodecandioic acid, or esters thereof. Examples of polyamide segments in such polyesteramides include those prepared by the reaction of hexamethylene diamine or dodecamethylene diamine with terephthalic acid, oxalic acid, adipic acid, or sebacic acid, and by the ring-opening polymerization of caprolactam.

Thermoplastic polyetheresteramide elastomers, such as those described in U.S. Pat. No. 4,230,838, can also be used to make the fibers and membranes. Such elastomers can be prepared, for example, by preparing a dicarboxylic acid-terminated polyamide prepolymer from a low molecular weight (for example, about 300 to about 15,000) polycaprolactam, polyoenantholactam, polydodecanolactam, polyundecanolactam, poly(11-aminoundecanoic acid), poly(12-aminododecanoic acid), poly(hexamethylene adipate), poly(hexamethylene azelate), poly(hexamethylene sebacate), poly (hexamethylene undecanoate), poly(hexamethylene dodecanoate), poly(nonamethylene adipate), or the like and succinic acid, adipic acid, suberic acid, azelaic acid, sebacic acid, undecanedioic acid, terephthalic acid, dodecanedioic acid, or the like. The prepolymer can then be reacted with a hydroxy-terminated polyether, for example poly(triethylene ether)glycol, poly(tetramethylene ether)glycol, poly(tetramethylene-co-2-methyltetramethylene ether)glycol, poly(propylene ether)glycol, poly(ethylene ether)glycol, or the like.

Fiber Alignment and Bonding

A key challenge in the FOE process is to take the as-spun yarns and align the fibers side by side with high packing density, orienting the fibers so that they face a preferred direction, and then consolidating them into a block that can be skived to create a film. This consolidated block can take many forms depending on the desired final product. For example, a rectangular billet with the fibers oriented perpendicular to the skived surface will create individual sheets of film when linearly skived. In a like manner a cylindrical billet with the fibers oriented radially relative to the cylinder axis will produce a long, continuous film when rotary skived.

Proper alignment of the fibers will help produce a defect-free FOE membrane. Fibers are preferably arranged parallel to each other in a direction referred to as the fiber direction or axis, with little or no fiber crossover or cross lapping. Fibers not aligned to parallel to the axis could conceivably cause structural defects when the fibers are consolidated and then skived. There are several methods for aligning the fibers; the usefulness of each depends on the orientation method, consolidation method and the ultimate billet form to be produced and which is the most cost-effective manner. Typically, the as-spun yarns are first wound up on bobbins. Most (but not all) alignment methods use these bobbins as a feed supply. Examples of alignment methods include, but are not limited to, forming the fibers into a ribbon, weaving yarns into a unidirectional fabric, skein winding, and on a bobbin itself.

Contaminants on the surface of the fibers could interfere with the merging of fiber to fiber, i.e. sheath to sheath, into a cohesive block. Without this good cohesion, membranes cut from the block could be too low in tear strength to perform adequately in their end-use environment. Water applied to the fibers in spinning aids in fiber handling and gives a clean surface.

Ribbon.

The term "ribbon" as used herein denotes a thin, flat arrangement of fibers that can be several inches to several feet wide but generally only a few fibers thick. It is desirable that the ribbon thickness be less than 0.2 inch (0.51 cm), but it is preferred that the thickness be less than 0.1 inch (0.25 cm), and it is more preferred that the thickness be less than 0.05 inch (0.13 cm). The fibers are lightly tacked together so that the ribbon can be handled without the individual fibers' coming loose. A common textile process for creating a ribbon of material is to take bobbins of yarn and assemble them into a creel, so-called beaming, with hundreds or even thousands of bobbins. The ends of each of these bobbins are combined in a comb and then wound up on a mandrel to form a beam. Once the beam is formed, the individual fibers that make up the beam can be tacked or bound together by one or more of several different means to create a sheet-like structure.

The appropriate yarn density of the beam, as defined by the number of yarn ends per unit width of the beam, will depend on several factors such as the number of fiber ends in a single yarn end and the denier of the filaments. For example if the denier of the filaments comprising a yarn end is small, a larger number of yarn ends will be required to create a beam where a few or all of the fibers are tacked to the neighboring filaments. Conversely, if the denier of the fibers is large, fewer yarn ends will be required to create a partially tacked fiber beam. Optimum yarn end density is desirable. Sparse yarn end density may create a poorly tacked beam and a very high yarn density will lead to a stiff beam, when tacked. Those skilled in the art will note that, in order to create a tacked fiber beam, the total number of yarn ends multiplied by the diameter of the yarn ends should be greater than the width of the beam.

The fibers may be bound together by any of a variety of techniques, including without limitation thermal fusing of the fibers, coating the fibers with a binder, and solvent bonding. There are many ways to thermally fuse the fibers. For example, the beam comprising the fibers can be passed through or over a heating unit (radiant heater, hot air convection heater, microwave heater, etc.,) thereby allowing the fibers to tack to each other. The fibers in the beam can also be tacked by passing the beam through one or more calendar rolls, which may or may not be driven. The beam may also be passed through heated or unheated nip rolls to control the thickness of the fiber beam. The heating method used depends on the type of fiber being fused and the beam density, as is well known in the art. It is desired that the fibers in the beam be tacked to only an optimum extent. If the fibers are weakly tacked to each other, they may come apart from the beam and break. Broken fiber or loose ends can lead to defects in the final fiber-on-end product. A ribbon can be formed from one type of fiber or from two or more types of fibers. The types of fibers can be differentiated in many different ways. For example, the fibers can vary in the size or shape of their cross-section, size, shape or the number of cores per fiber, polymer components comprising the fibers. The fibers can also vary in properties such as, for example, color, chemical composition, surface chemistry and electrical conductivity. The different types of fibers can be distributed randomly during the beaming operation, or they can be distributed in a desirable repeating or non repeating pattern.

Fabric.

Another method of aligning the yarns is to weave them into a unidirectional fabric. The term "fabric" as used herein denotes a planar textile structure produced by interlacing yarns fibers or filaments. A "unidirectional fabric" is a fabric made with a weave pattern designed for directional strength in one direction only. The yarns can be woven in either the weft or warp direction. Each has different advantages. Weaving the yarns in the warp direction involves less setup since it can be fed from a single bobbin; also, the yarn density can be adjusted. Alternatively, placing the yarn in the weft direction (for "uni-weft" fabric) requires a large number of bobbins, similar to that for beaming; but the advantage is that, once the creel is set up, the fabric can be produced at a higher rate. In both cases, the cross axis yarn is a low melting point binder fiber woven in a loose weave that ties the fabric together. In one embodiment of the process described herein, a unidirectional weft ("uni-weft") fabric is woven, having a high density of fibers in the weft direction but very sparse warp fibers, and the warp fibers are low melt temperature fibers that are melted after the weaving process and are thereby used to hold the weft fibers together.

As with ribbon, woven fabrics can comprise of one or more types of fibers. The different types of fibers can be woven randomly into the fabric or can be woven to create a specific repeating or non-repeating pattern.

Bobbin Winding.

A typical windup has a helix angle for winding where yarns cross lap each other at that angle. However, it is possible to wind the yarns at a very low angle such that the fibers lay essentially parallel to one another. The fibers can be wound to an inch in depth or more; however a depth of from 1/16" to 1/4" (1.6 mm to 6.4 mm) is advantageous for further processing. These fibers may be bound together by thermal fusing of the fibers, by coating the fibers with a binder or by solvent bonding. For thermal fusing, the bobbin can be placed into an oven where the fibers loosely fuse together. The oven temperature will depend on the fiber composition. The fused fiber material=can then be cut off the bobbin and placed flat to form a unidirectional mat of fibers. For our tests we generally fused bobbins with 1/16" (1.6 mm) and 1/8" (3.2 mm) thick wound fiber on 6" (15 cm) cores. The bobbins were heated in an oven at 80-90° C. for 2 hours. After removal from the core, the mat of fibers was well tacked together with high fiber density and it was thin enough to be easily laid flat for subsequent cutting into shapes referred to as coupons or pre-pregs.

As an illustration, fibers were wound on a bobbin to a thickness in the range of 1/32" (0.8 mm) and 1/8" (3.2 mm). The temperature used to fuse the fibers on the bobbin is determined according to the melting point of the outer sheath of the fiber. It is desirable that fusing temperature be about 15° C. above or below the onset of melting of the polymer that makes up the outer sheath. The onset of melting of a polymer can be obtained with the help of a differential scanning calorimeter. If the polymer does not have a melting point then the fusion temperature can be in the range of the softening temperature of the polymer. Once the wound filaments have been partially fused by heat treatment, the partially sintered fibrous structure can be slit or cut in a direction parallel to the axis of the bobbin, yielding a curved or flat plate comprising fibers that run in one preferred direction.

Skein Winding.

The fibers can be wound on a skein winder to produce a loose coil of yarn. This yarn can then be placed directly into a mold as a hank of parallel fibers and consolidated under heat and pressure, to form a billet. Alternatively, the fibers may be bound together by coating the fibers with a binder or by solvent bonding. Procedures and equipment common to the composite industry can be used to achieve the structures desired in this step and for the cutting of coupons or pre-pregs.

Billet Formation and Skiving

The final billet requirements are determined by the desired product and cost of assembly. For a billet that is to be skived into discrete sheets (linear skiving), all the fibers are arranged parallel to each other and are usually oriented perpendicular to the skiving surface. In some applications, skiving at an angle to the fiber axis brings additional value to the membranes. This type of skiving will produce sheets with the area of the surface to be skived. Billets suitable for linear skiving can be produced by a variety of methods, including, but not limited to, pleating followed by fusion and stacking followed by fusion. A schematic of the process is illustrated in FIG. 1. A ribbon or fabric 1 formed from a plurality of parallel, bonded fibers is passed through a pleating zone 2 into a fusion zone 3 where the pleats are to be fused into a solid block 4. The fiber-on-end membrane 5 can be skived (using skiving knife 6) continuously from the block as it is consolidated, or the block can be machined into parts which are later assembled for, e.g., rotary skiving, as explained below.

Pleating.

A fused ribbon or fabric can be run through a continuous pleating operation in which the ribbon or fabric is repeatedly folded and then stacked together. This process is similar to the pleating process used to make folded filter media or pleats in fabrics. The process is illustrated in FIG. 1. Typical conditions were used in Example 1 below, in which uni-weft fabric was pleated with a pleat height of 0.5" (1.3 cm), and the pleating unit was run at 30 pleats per minute at 80° C. and 30 psi (0.21 MPa).

Under heat and pressure, these pleats can be made to tack together to form a batt in which the fibers are typically now oriented substantially perpendicular to the batt surface. This batt can be used in several ways. It can be placed into a rectangular mold and then consolidated under heat and pressure to form a rectangular billet that can be skived into sheets. Additionally, the batt or the rectangular billet formed therefrom can be sectioned into segments (for example, trapezoidal or other shapes) that can be assembled to orient the fibers radially in preparation for rotary skiving, as described below.

Figure 2:
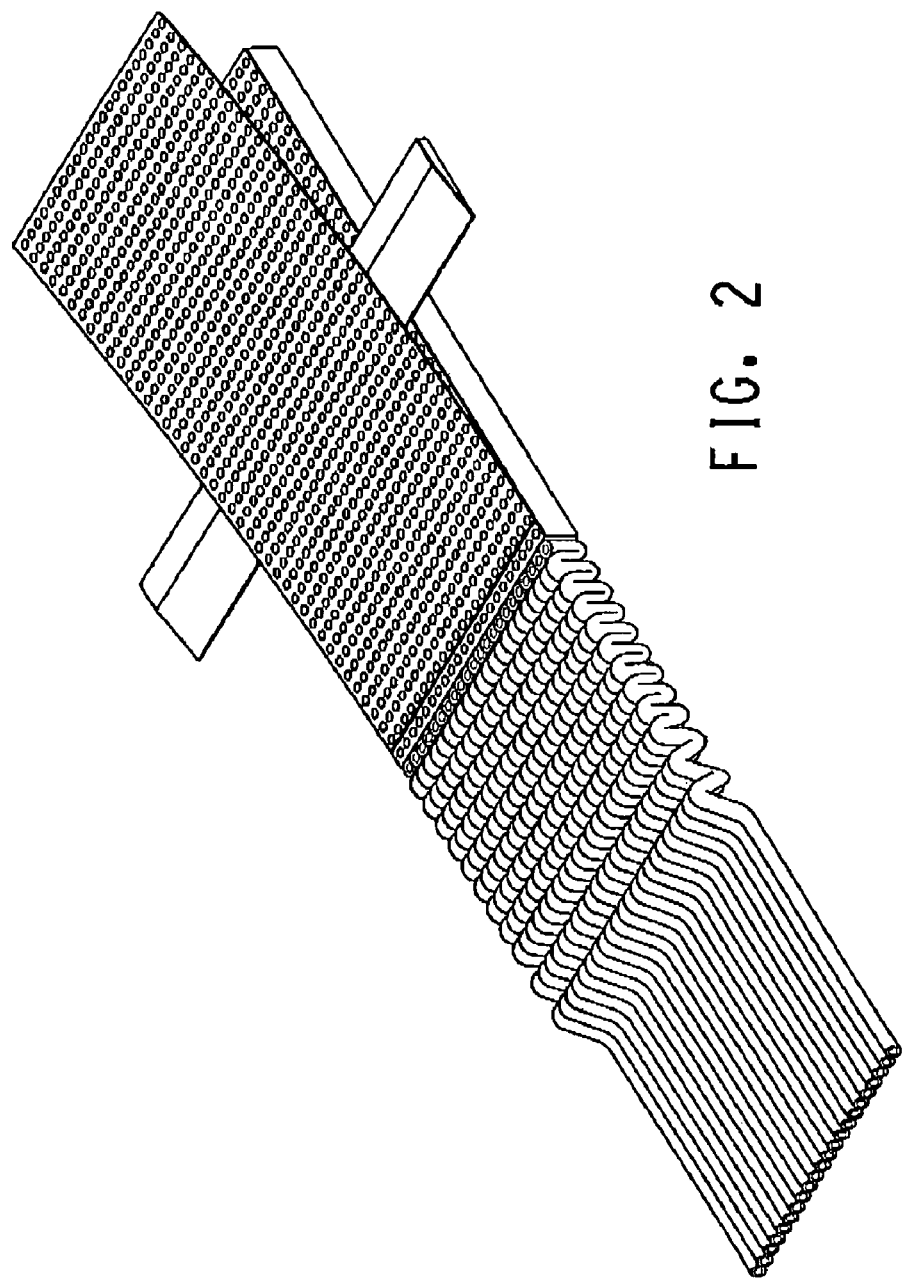
FIG. 2 is a schematic drawing showing the production of a thin solid by pleat depth adjustment.

The pleating process can be adapted to make thin solids (see, for example, FIG. 2), further decreasing heat transfer or solvent diffusion issues and minimizing the number of layers that must be skived from the solid material thereby increasing productivity. In cases where a thick membrane is desired, for example, in production of a capillary array, the membrane can be made at nearly the final shape by adjusting the fold depth to the desired thickness.

Stacking

Figure 3A:
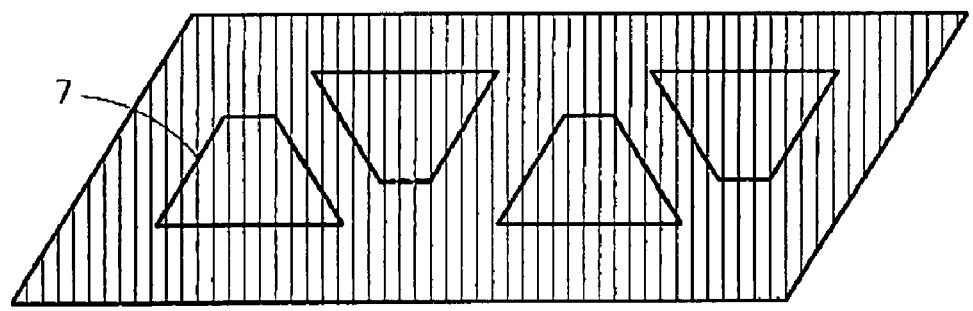
FIGS. 3A-3C are schematic drawings showing the production of a billet by cutting (3A), stacking (3B), and molding trapezoidal shapes (3C) from a consolidated mat.
Figure 3B:
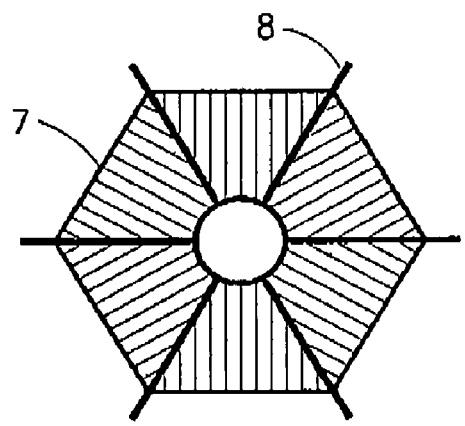
Figure 3C:
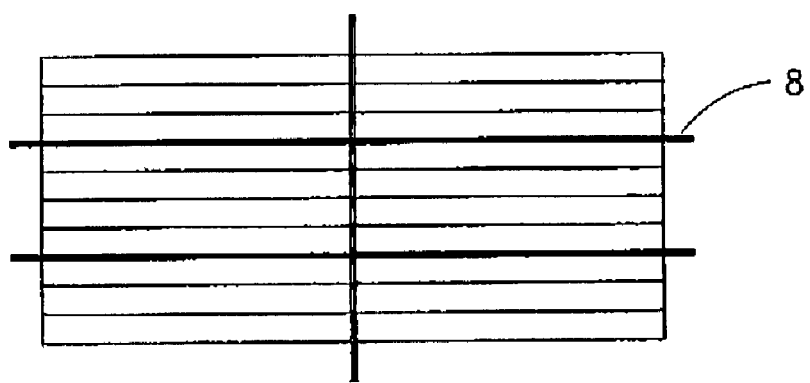

In the bobbin winding process, mats of fused fibers that are created can be stacked together and then molded to create a three-dimensional billet. This billet can be skived to form individual sheets of film or the billet can be cut into sections that can be assembled into a cylindrical billet for rotary skiving. The mat can also be cut into sections that can be assembled to orient the fibers in a radial direction. For example, the trapezoidal shaped sections 7 can be cut from the mat (FIG. 3A) and then stacked together in a hexagonal shaped mold FIG. 3B). When molded under sufficient heat and pressure, the individual sections will fuse together to form a solid billet ready for skiving. Alternatively, several such solid billets can be stacked on top of one another and fused to form a single large billet suitable for skiving wider film. This process also allows for the addition of other materials during the molding operation. For example, adding a high strength material or fibers between the segments (8 in FIG. 3B, 3C) in one or both directions, across the billet and/or around it, but completely from outside to inside the billet thickness, can result in a higher strength skived film in one or both directions than can be achieved by the fibers-on-end themselves.

Production of a Cylindrical Billet for Rotary Skiving

Figure 6:
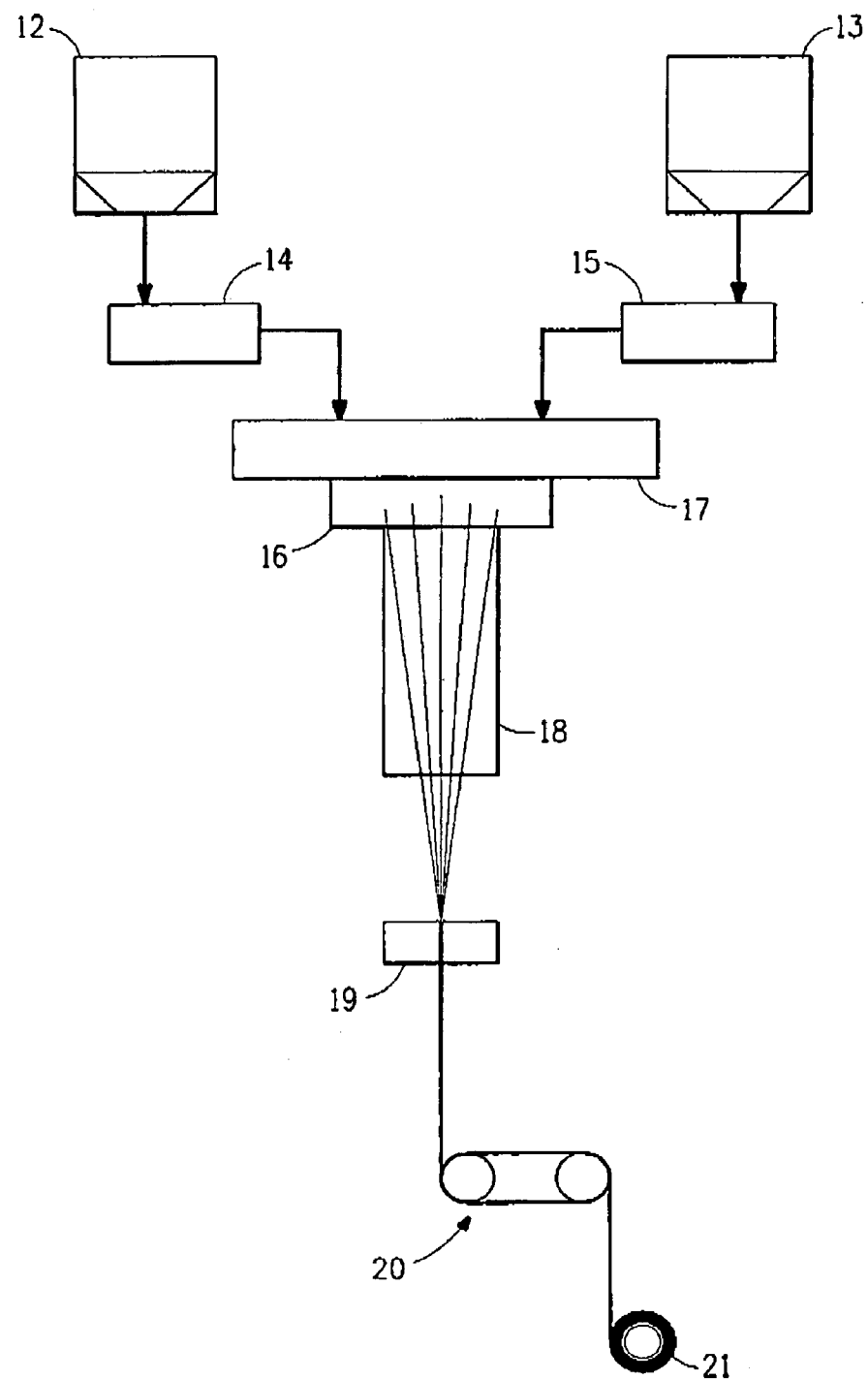
FIG. 6 is a schematic of the spinning line used in Example 1.

Any of the methods described above can be used to make a rectangular billet of FOE material. While these billets can be used in a linear skiving process to make individual sheets of film there are applications where a continuous roll of film is preferred. A continuous roll can be produced by rotary skiving, in which a cylindrical billet is spun on its axis, and skiving produces a film that is the width of the billet but of a very long length (FIG. 6). In such a cylindrical billet, the fibers are oriented in an essentially radial direction from the axis. We have developed a process for assembling sections of rectangular billets into a cylindrical form suitable for rotary skiving.

Figure 4A:
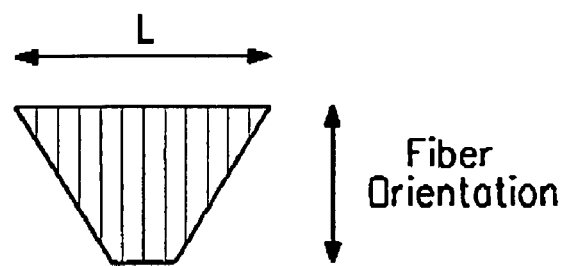
FIGS. 4A-4B are schematic drawings showing the application of a capping film (4B) to a trapezoidal section (4A).

First, the billets are cut or machined into sections. In one embodiment, the section is a trapezoidal section, as shown in FIG. 4A. As used herein the term "trapezoidal section" indicates that the shape cut from the billet is a trapezoid in cross-section. In another embodiment, the section is an annular sector. As used herein, the term "annular sector": indicates that the shape cut from the billet is an annular sector in cross-section, as shown in FIG. 11. Trapezoidal sections are cut with the fiber orientation perpendicular to the base of the trapezoid (FIG. 4A). The trapezoidal sections are used to make a billet that is two concentric polygons in cross-section. In a preferred embodiment, three trapezoids are welded together to form a triplet (FIG. 5A) and then two triplets are then welded together to form a solid that is two concentric hexagons in cross section (FIG. 5B) that is mounted on a spindle for skiving (FIG. 9) to produce a cylindrical outer surface and allow rapid skiving of a continuous FOE membrane. Analogously, larger numbers of trapezoidal sections could be cut and fused in this manner; for example, eight sections could be cut, two quadruplets formed, and a billet made by welding two quadruplets together to form a solid that is two octagons in cross-section. Alternatively, annular sectors can be cut and assembled analogously, with the fiber orientation perpendicular to the outer arc (FIG. 11), to form a cylindrical billet that is two concentric circles in cross-section.

There are many ways to weld the cut sections together. The sections can be welded by heating in an oven with or without pressure. Most other known plastic welding techniques can also be used, including, without limitation, hot plate welding, vibration welding, and ultrasonic welding.

In some instances it is preferred to cap the machined surfaces prior to welding. Heat sealing a solid film 9 onto the surfaces (FIG. 4B) protects the fibers and prevents the migration of the core material during the welding process.

The annular sector shown in FIG. 11 consists of essentially parallel fibers with the longest fibers essentially radially oriented. These sections (sectors) are die cut from a sheet of fused filaments that are fused on the yarn bobbin in an oven then laid flat, as described above. They could also be die cut on the bobbin leaving a small curvature to the sections that could be made flat, if desired, when all sections are fused under pressure and heat to create the final billet. The capping films on these segments as shown in FIG. 10 could vary in composition, molecular weight, and/or melting point according to the value the choice adds either to processing into a billet or to skiving or to product.

The processes described herein makes it practical to manufacture porous membranes or capillary arrays of any desired width and length from fibers arranged on end using a continuous and/or automated process. Additionally, lower manufacturing costs are achievable as a result of continuous processing and the reduction in fabrication steps.

Where a range of numerical values is recited herein, unless otherwise stated, the range is intended to include the endpoints thereof, and all integers and fractions within the range. It is not intended that the scope of the invention be limited to the specific values recited when defining a range.

Applications

Additional processing steps and eventual applications will depend in part on the nature of the original fibers and the thickness of the skived layer. If the fibers used to make the fiber-on-end materials have special properties then the membrane or capillaries formed by skiving the material will also have special properties and unique value. Such properties may be, for example, a special distribution of hole sizes or a geometrical arrangement of different multicomponent fibers to form a unique array, or a unique angularity or multiple angularity of fiber axes, or selected values of conductivity or surface energy or surface chemistry or optical index, color, or species diffusion (selective permeation). As used herein, the term "angularity" refers to the angle the fiber axes in a given FOE material make with the perpendicular to the surface of the FOE material. For example, an article may comprise at least two parallel capillary arrays, wherein the capillaries within each array are essentially all aligned at a particular angle off the perpendicular to the surface of the array (i.e., have the same angularity), but the angularity of the capillaries in one array differs from the angularity of the capillaries in one array differs from the angularity of the capillaries in at least one other array.

Porous Membranes and Capillary Arrays

In one embodiment of the process of the present invention, porous membranes are produced. If the original fibers are hollow (i.e., the core is air), then the layer or membrane skived from a fused block of fibers will be porous and have regularly spaced and uniformly sized holes with a properly prepared billet. If the original fibers are bicomponent fibers with a solid core that is made of a material that can be dissolved after spinning, then a porous membrane can be made after skiving by dissolving away the core to form holes. Similarly, if each fiber has multiple cores of the "islands in the sea" type, having a number of smaller dissolvable fiber cores arranged within a sea of a different polymer, then the islands may be dissolved to form membranes with smaller pores, i.e., microporous membranes.

Many other variations are possible. For example, the original fiber could be tricomponent, with a central core that is air or is a solid that can be dissolved away, an inner sheath that is rigid and contributes a special functionality (e.g., hydrophilicity, hydrophobicity, conductivity), and an outer sheath that is fusible at a lower temperature than the inner sheath or core materials.

As another example, the original fiber could be a tricomponent fiber, with a central core that is air or is a solid that can be dissolved away, an inner sheath that is capable of changing volume in the presence of an external stimulus (i.e., temperature, chemical exposure, etc.) and an outer sheath that is fusible at a lower temperature than the inner sheath or core materials. A membrane created from such fibers would be capable of changing its pore size and hence its permeability whenever the external stimulus is applied or taken away.

As yet another example, a fiber on end sheet or membrane can be made in which the walls of the capillaries have active or reactive chemical moieties on the surface, such as carboxylic acid groups, hydroxyl groups, amine groups, epoxy groups, anhydride groups etc. The sheet or membrane can be made by fabricating an FOE billet using a multicomponent fiber comprising a central core that can be dissolved away, an innermost sheath containing the active or reactive chemical moieties at the surface after the central core is dissolved, and an outermost sheath that is fusible at a lower temperature than the innermost sheath or core materials. Alternatively, the fiber could be hollow and be made of an inner sheath with the desired moieties at the surface and an outer sheath that is fusible at a lower temperature than the innermost sheath. Membrane created from such fibers could be used for affinity separation of species as they flow through the capillaries of one or more FOE capillary arrays, such as the membrane chromatography applications described by R. Ghosh in "Protein separation using membrane chromatography: opportunities and challenges," Journal of Chromatography, 952(1-2), pp 13-27, 2002. As is known to those skilled in the art of chromatography in general and membrane chromatography in particular, the active or reactive chemical moieties along the capillary wall may be used to attach or graft other reactive groups such as sulfonic acid groups, quaternary amine groups, metal ions, enzymes, proteins etc., which will selectively bind to specific biological and chemical species that need to be purified or removed from a process stream. Those skilled in the art may know that conventional membranes, display a broad distribution in pore sizes. Because of this variation in pore sizes the fluid flow is biased through the largest pores of the membrane and small pores do not contribute much to the total flow rate. For membrane chromatography applications, it is desirable that all pores with active sites contribute to fluid flow and hence to the separation process. The uniform capillary pores achieved in the FOE capillary arrays described herein can allow for more uniform flow through all pores of the membrane and enhance the efficiency of the separation process.

Some applications may benefit from a bimodal, trimodal or other controlled distribution of pore or core sizes, with some holes functionalized, others not. This can be achieved by using a mixture of fiber diameters or fiber component diameters. For example, hollow fibers of the same outer diameter but different wall thickness, thus, different hole size, could be used.

Examples of uses for the FOE membranes described herein include without limitation filters for particle sizing with defined sized distribution (for example, monodisperse or, if fibers of two different diameters are used, bimodal), chromatography membranes, and adaptive membrane structures that change permeability in response to a stimulus and apparel, as described below.

The porous membranes can be used as the hole-containing components of adaptive barrier membrane structures as described in U.S. Pat. Nos. 7,597,855 and 7,625,624, and pending U.S. patent application Ser. Nos. 11/584,999, and 11/584,927, which are hereby incorporated by reference in their entirety. An adaptive membrane structure includes first and second membranes having holes, and means to respond to an actuating stimulus that moves the first membrane into contact with the second membrane in a position in which the holes of the first membrane are substantially out of registration, or are out of registration, with the holes of the second membrane, thereby change the permeability of the membrane structure. In an alternative adaptive membrane structure, the porous membrane of the present invention is one of two adjacent membranes, the second membrane containing an array of protruding members, each protruding member shaped and positioned so as to be insertable in and enter a hole in the porous membrane when one or both membranes are moved toward each other in response to application or removal of a stimulus. As each protruding member enters its corresponding hole, it contacts the inner surface of the hole in such a way as to create a seal between the protruding member and its mating hole, thereby eliminating paths permeation, convection and/or diffusion.

Examples of articles into which adaptive membrane structures can be usefully incorporated include without limitation apparel (e.g., a protective suit, a protective covering, a hat or other head covering, a hood, a mask, a gown, a coat, a jacket, a shirt, trousers, pants, a glove, a boot, a shoe and a sock); an enclosure (e.g., a tent, a safe room, a clean room, a greenhouse, a dwelling, an office building or a storage container); and a valve for controlling the flow of gas, vapor, liquid and/or particulates. The protective covering could be a protective garment for chemical protection, biological protection, or both, including without limitation, a coverall, a protective suit, a coat, a jacket, a limited-use protective garment; a glove; a sock, a boot; a shoe or boot cover, trousers, a hood, a hat or other head covering, a mask, and a shirt, a medical garment, a surgical mask, a medical or surgical gown, or a slipper.

The membrane pores can also be functionalized chemically to impart particular properties, such as catalytic or enzymatic activity, reactivity, adsorptivity, hydrophilicity, hydrophobicity, and the like.

A porous membrane produced as described herein can also be used to support other inorganic, organic or biological materials either on its surface or inside its capillary pores. These materials may be physically supported or chemically grafted to the membrane. By the introduction of other materials on the membrane or inside its pores, a composite membrane may be formed which may be used for many different applications such as filtration, separation, purification, protection, sensing and diagnostics.

Porous membranes from this invention can also be used as templates for the synthesis or fabrication of advanced materials. The capillaries could be the sites for die casting or replication of reverse image structures. The uniform capillary pores of the membrane can be used as tiny reactors to synthesize materials such as microtubes and nanotubes. These advanced materials can be left in the pores to yield a composite membrane or can be recovered by dissolving away the membrane in a suitable solvent. When the advanced materials are such that are stable at very high temperatures, they can be recovered by incinerating or burning the outer membrane at high temperatures.

Membranes with Filled Pores or Capillaries

In another embodiment, the process described herein is used to produce membranes containing filled pores or capillaries. For example, the core material of sheath-core fibers used may be left undissolved if desired, and the core material could, depending on its composition, impart special functionality to the membrane, such as fire resistance, antimicrobial activity, thermochromic properties, and the like. For example, the core material could comprise a polymer that has been compounded with a sufficient level of flame retardant, antimicrobial agent, insecticide and insect repellants to impart that property to an article comprising the membrane. A few examples of flame retardants that could be incorporated in this manner are halogen- and phosphorous-containing flame retardants, including without limitation decabromodiphenyl oxide, cyclic phosphonate esters, triphenyl phosphate, poly (sulfonyldiphenylene phenylphosphonate) and ammonium polyphosphate. Surface properties can also be modified by using core materials comprising antistatic agents or electrically conductive materials, or hydrophobic or hydrophilic substances (e.g., polymers or oligomers).

If the fiber-on-end material is skived so as to from a thick layer, then long capillaries rather than shorter holes can be made. Such a capillary membrane can be used to selectively wick fluids or to store and dispense fluids in a controlled manner. Such a membrane could be used for controlled release of drugs in, for example, medical materials, devices, or implants, including without limitation a bandage, wound dressing, catheters, prostheses, pacemakers, heart valves, artificial hearts, knee and hip joint implants, vascular grafts, orthopedic fixtures, ear canal shunts, cosmetic implants, implantable pumps, hernia patches, and artificial skin. The membrane itself could be made from a material that is absorbed into the body longer term when implanted.

A capillary membrane could be impregnated with a variety of functional materials. The term "functional material" as used herein means a substance with which the capillaries of the membrane are infused so as to impart desired properties, such as, but not limited to, heat regulation, antimicrobial activity, fire resistance, optical properties, antistatic properties, and anticorrosion properties. The functional material could be a liquid itself, wicked into the holes by capillary action, or dissolved in a solution, wherein the solvent is evaporated after the solution impregnates the membrane. The functional material might also be spun as part or all of sheath or core components of the fibers used to make the membrane.

For example, paraffin waxes are examples of phase change materials used in heat regulation applications. Thus, a paraffin wax could be dissolved in methylene chloride and incorporated into a porous capillary membrane by wicking, after which the solvent would be evaporated, leaving behind the paraffin wax. An article comprising such a filled capillary membrane would demonstrate desirable heat regulation characteristics depending on the temperature of the environment. Representative examples of articles containing a capillary membrane that incorporates a phase change material include without limitation blankets, upholstery for the home and for automobile seating, bedding (such as pillows, pillow cases, sheets, comforters, bedspread, mattresses, mattress covers), exposure suits for underwater diving, footwear (such as shoes, boots, ice skating boots, sneakers, and slippers) midsoles and liners, gloves and mittens, hats, ski masks, jackets, coats, parkas, snowsuits, ski pants and other pants, thermal underwear and other intimate apparel, vests, shirts, blouses, sweaters, dresses, and potholders.

Antimicrobial and antiodor agents can also be incorporated as functional fillers in the present invention. An antimicrobial agent is a bactericidal, fungicidal (including activity against molds), and/or antiviral agent. These include, for example, chitosan and its derivatives, triclosan, cetyl pyrridinium chloride, polybiguanide-based compounds; and the alkyl (especially methyl, ethyl, propyl, and butyl) and benzyl esters of 4-hydroxybenzoic acid, which are commonly referred to as "parabens." Use of a specific antimicrobial or antiodor functional filler with a specific capillary membrane structure will require a solvent that will dissolve the functional filler but not affect the membrane structure. The antimicrobial and anti-odor articles of the invention find application in uses such as apparel, including without limitation liners and midsoles for footwear (such as boots, shoes, slippers, sneakers), gloves and mittens, hats, shirts and blouses, outer wear, sweaters, dresses, intimate apparel, and medical garments; healthcare, including medical drapes, antimicrobial wipes, handkerchiefs, and medical packaging.

Insecticides and insect repellants can also be used as functional fillers. Examples include but are not limited to N,N-diethyl-m-toluamide ("DEET"); dihydronepetalactone and derivatives thereof; essential oils such as citronella oil, backhousia citriodora oil, melaleuca ericafolia oil, callitru collumellasis (leaf) oil, callitrus glaucophyla oil, and melaleuca linarifolia oil; and pyrethoid insecticides, such as but not limited to permethrin, deltamethrin, cyfluthrin, alpha-cypermethrin, etofenprox, and lambda-cyhalthrin. Articles containing an insecticidal and/or insect repellant material or compound that are made from or incorporate a filled capillary membrane structure of the invention find application in uses such as apparel, including without limitation hats, hoods, scarves, socks, shoe liners, shirts and blouses, shorts, pants; tents, tarpaulins and bedding.

Microprojections

If the fibers are single core, or "islands in the sea" type having a number of smaller fiber cores ("islands") arranged within a sea of a different polymer, wherein the sea is dissolvable in a solvent that does not dissolve the islands, then the sea may be etched to form a surface that has many micro-projections or hairs. Such a surface can be made to possess super-hydrophobic properties, useful in, for example, self-cleaning surfaces or stay-dry materials.

All of the above examples are of higher value and utility than the fibers themselves. The FOE materials produced as described herein can find new applications in filtration, protective membranes, drug delivery, self cleaning super-hydrophobic surfaces and many other exciting new materials.

EXAMPLES

Specific embodiments of the present invention are illustrated in the following examples. The embodiments of the invention on which these examples are based are illustrative only, and do not limit the scope of the appended claims.

The meaning of abbreviations is as follows: "h" means hour(s), "min" means minute(s), "m" means meter, "cm" means centimeter(s), "mm" means millimeter(s), "μm" means micrometer, "g" means gram(s), "mL" means milliliter(s), "psi" means pounds per square inch, "ksi" means thousand(s) of pounds per square inch, "MPa" means megapascal(s), and "rpm" means revolutions per minute.

Surlyn® is a registered trademark of .E. I. du Pont de Nemours and Company.

Elvamide® is a registered trademark of .E. I. du Pont de Nemours and Company.

Nucrel® is a registered trademark of .E. I. du Pont de Nemours and Company.

Example 1

This example describes a laboratory-scale fiber-on-end process used to create microporous membranes.

Sheath-core fibers were spun on a continuous fiber spinning line. A schematic of the spinning line is shown in FIG. 6. The spin pack was used to create a sheath core filament structure has been previously described in U.S. Pat. No. 2,936,482 and subsequent patents and publications. The sheath of the fibers was formed from Surlyn® 8150 resin, which is an ethylene/methacrylic acid copolymer in which the methacrylic acid groups have been partially neutralized with sodium ions, sold by E. I. du Pont de Nemours and Company (Wilmington, Del., USA). The core of the fibers was formed from Elvamide® 8061 nylon multipolymer resin, a low-melting ($T_m$=156° C.), general purpose nylon multipolymer resin also sold by E. I. du Pont de Nemours and Company.

Before fiber spinning, Surlyn® 8150 resin and Elvamide® 8061 nylon multipolymer resin were dried for 16 h at 60° C. in a vacuum oven with a dry nitrogen sweep. The dried polymers (12 and 13) were melted in two separate co-rotating twin screw extruders (14 and 15). The extruder that fed the molten ionomer was set at 255° C. and the one that fed the molten Elvamide® 8061 nylon multipolymer resin was set at 200° C. Both polymer melt streams from the respective extruders were fed to separate Zenith gear pumps, which then metered the molten polymers through to spin pack 16. The speeds of the two gear pumps were preset so as to supply 11.2 g/min of the ionomer and 4.8 g/minute of the Elvamide® 8061 nylon multipolymer resin respectively. These flow rates allowed the outer sheath in the sheath core fiber to be nominally 70% by weight and the core to be nominally 30% by weight. The spin pack was heated to 244° C. using heated block 17. Both polymer streams were filtered through three 200 mesh and one 325 mesh screen in their respective partitions within the pack. After filtration, the copolyamide was metered through 0.015" (0.38 mm) diameter orifices of 0.030" (0.76 mm) length into a surrounding sheath pool of ionomer, which was metered for concentric placement by an offset of 0.004" (0.10 mm), as measured from the flat metal surface containing the core orifices and the top of the plateau as described in U.S. Pat. No. 2,936,482. Sheath and core then flowed down a counterbore of 0.0625" (1.6 mm) diameter and approximately 0.325" (8.26 mm) length until they reached a filament forming orifice of 0.012" (0.30 mm) diameter and 0.050" (1.3 mm) length. A total of 34 individual sheath-core filaments were created at the spinneret orifice outlets.

These 34 resulting filaments were cooled in ambient air (quench zone 18), given a water surface finish (19), and then combined in a guide approximately eight feet (2.4 meters) below the spin pack. The 34 filament yarn was pulled away from the spinneret orifices and through the guide by a pair of rolls 20 turning at approximately 1200 meters per minute. From these rolls the yarn was taken to a conventional winder 21 and wound onto several bobbins. The average denier per filament for the yarn was measured to be 3.6.

The sheath/core yarn was taken off the bobbins and wound onto a rotating heated roll that was set at 85° C. The rotational speed of the roll was set at approximately 58 rpm. The outer diameter of the roll was estimated to be 10.11" (25.68 cm). As the yarn was being taken up by the rotating roll, it was also linearly traversed by an oscillating guide along a direction that was parallel to the axis of the rotating cylinder. The oscillating guide was manufactured by Mossberg Industries, Cumberland, R.I. The oscillating amplitude of the guide was set to 5 inches (13 cm) and this allowed the yarn to spread out over a distance of 5 inches (13 cm) on the heated roll. The linear speed of the guide was kept small to ensure that the helical angle for the winding was extremely small. Approximately 2,800 meters of the sheath core yarn was wound onto the heated roll. After the winding was completed, the roll was allowed to cool to room temperature. This allowed each yarn winding to lightly fuse to its nearest neighbors and form a 5" (13 cm) wide ribbon. This lightly fused ribbon was slit, taken off the roll and laid flat on table. The resulting ribbon was 31.75" (80.64 cm) long, 5" (13 cm) wide and approximately 0.03" (0.76 mm) thick. It weighed 38.24 g and consisted of approximately 118,500 sheath core filaments all running parallel to the longest axis of the ribbon. The density of the ribbon was estimated to be 0.49 g/cm$^3$. The yarn density in the ribbon was estimated to be 349 yarn ends/linear inch. A total of 4 ribbons were created by this method. Using a sharp blade, each ribbon was slit into equal halves, yielding 8 ribbons, each having a length of 31.75" (80.64 cm), a width of 2.5" (6.4 cm) and a thickness of 0.03" (0.8 mm).

Each ribbon was then manually folded over itself at a recurring distance of 2.25" (5.72 cm) to form pleats. Pleating was carried out along the length of the ribbon, which was also the direction of orientation of the fibers that made up the ribbon. Each pleated ribbon was then compressed under an 8.5 lb (3.9 kg) weight for 30 minutes in a convection oven set at 85° C. This caused the fibers in the pleated ribbons to partially fuse to their neighbors. Marks were made on each plate to show the direction of the orientation of fibers. This process yielded a total of 8 partially fused plates that were approximately 2.5"×2.25"×0.45" (6.4 cm×5.72 cm×1.14 cm). The 8 partially fused plates thus formed were stacked on top of each other making sure that the fiber orientation in all the plates was in the same direction. The entire stack was heated to 85° C. in a convection oven for 60 minutes. The heated stack of plates was removed from the oven and immediately sandwiched between two pre-heated aluminum plates and then compressed in between a heated Carver hydraulic press. The temperature of the press was set at 85° C. and the pressure for compression was 15 psi (0.10 MPa). After 30 minutes of compression, the heaters in the hydraulic press were turned off and the stack was allowed to cool to room temperature while still under 15 psi (0.10 MPa) of compression pressure. This process of compressing the stack of preconsolidated plates allowed them to fuse to form a single block of dimension 2.5"×2.25"×1.99" (6.4 cm×5.72 cm×5.05 cm) with a density of 0.83 g/cm$^3$. This block was trimmed to a final dimension of 1.98"×1.98"×1.99" (5.03 cm×5.03 cm×5.05 cm with the help of a band saw. The block now weighed 105.7 g.

This preconsolidated block was placed in the cavity of a metal mold such that the direction of the oriented fibers in the block was perpendicular to the vertical wall of the mold cavity. The mold cavity was 2.0"×2.0" (5.08 cm×5.08 cm) square and its height was 5" (13 cm). Two metal rams were placed on the open ends of the mold cavity so as to sandwich the preconsolidated polymer block. The mold was placed in between a Carver hydraulic press and a pressure of 1000 psi (6.9 MPa) was applied on the rams. The outside wall of the mold was then heated with the help of tightly fitting circular Watlow band heaters that wrapped around the mold. The temperature of the mold was measured by a thermocouple inserted into the mold wall and the temperature of the mold was controlled by temperature controllers. Once the heaters were turned on, it took 40 minutes for the thermocouple to stabilize to 95° C. The polymer block was held at this temperature and 1000 psi (6.9 MPa) of pressure for 2 h, after which the heaters were turned off and the block was allowed to cool while still under 1000 psi (6.9 MPa) of pressure. When the block had cooled to room temperature, it was removed from the mold cavity. The final dimensions of the block were 2.0"×2.0"×1.64" (5.08 cm×5.08 cm×4.17 cm). The density of the block was estimated to be 0.98 g/cm$^3$. This density suggests that the block was completely consolidated with little or no void space present in the block.

Figure 7A:
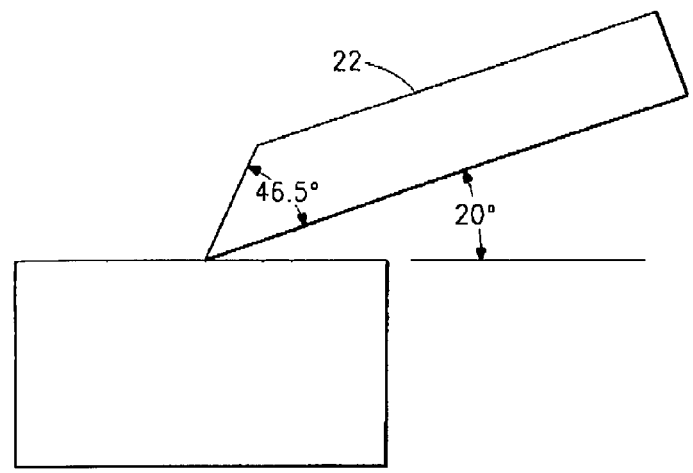
FIGS. 7A-7B are schematic drawings showing a side view (7A) and a top view (7B) of the skiving process used in Example 1.
Figure 7B:
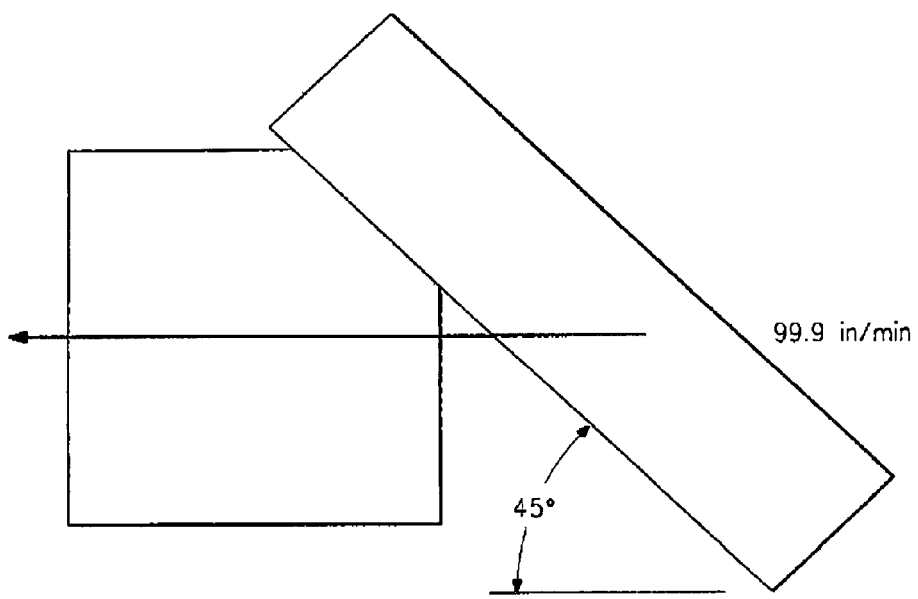

Thin films of varying thickness were skived from the fully consolidated block, as shown in FIG. 7. Films were skived on a Bridgeport vertical milling machine that had been retrofitted for this specific application. A wedge type tungsten carbide blade, HB971 manufactured by Delaware Diamond Knife was used as the cutting tool (22). The cutting plane was perpendicular to the axis of orientation of fibers that were used to create the solid polymer block. The angle between the surface of the work piece and the blade was fixed at 20 degrees. The cutting speed was 100 inch/minute (254 cm/min). The blade moved along the plane of the cutting surface in a direction that was 45 degrees relative to the work piece (see FIG. 7). This angle generated both slicing and plowing vectors. The size of the skived films was 2.0"×1.64" (5.08 cm×4.17 cm). Film samples of three different thickness were obtained: 0.002" (51 µm), 0.004" (102 µm) and 0.006" (152 µm).

Figure 8:
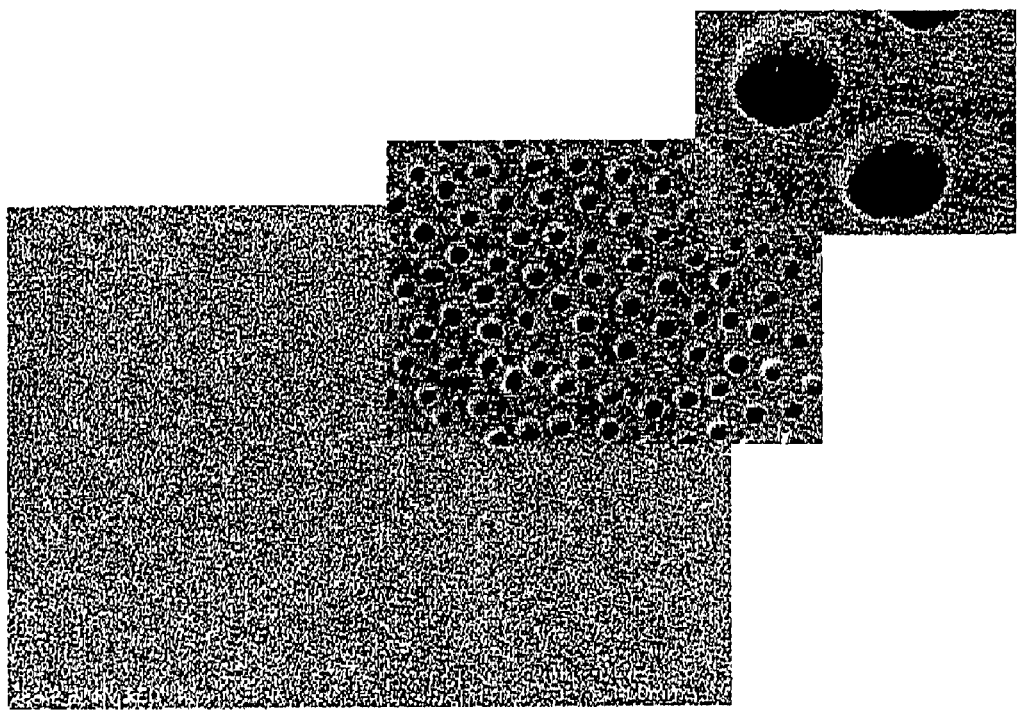
FIG. 8 shows scanning electron micrographs at three magnifications of the porous membrane produced in Example 1.

Skived film samples were soaked in concentrated formic acid (90% by weight) between 5-10 minutes. Formic acid dissolved out the Elvamide® 8061 nylon multipolymer resin phase in each film and thereby created microporous membranes. The weight of film samples before dissolution and after dissolution of the Elvamide® 8061 nylon multipolymer resin phase was measured. Gravimetric analysis showed that the Elvamide® 8061 nylon multipolymer resin phase was about 30% by weight of the films. The density of Elvamide® 8061 nylon multipolymer resin is 1.07 g/cm$^3$. Thus the porosity of the membranes was estimated to be 28%. Membrane samples thus created were analyzed under a scanning electron microscope (SEM). The SEM images showed cylindrical pores in the membranes (see FIG. 8). SEM images also showed the absence pin holes or other defects in the membrane samples. Analysis of the SEM images (NIH 1.62 image analysis software developed by National Institute of Health, Bethesda, Md.) showed the average pore size of the membrane to be 9.8 µm. The microporous membranes of this example were also characterized with the help of a flow through capillary porometer, distributed by Porous Materials Inc., Ithaca, N.Y. Porometer results yielded a mean flow pore diameter of 11.4 µm.

Example 2

This example describes the formation of a solid billet by pleating and consolidating a unidirectional fabric.

Sheath-core fibers with Surlyn® 8150 resin sheath and Elvamide® 8061 nylon multipolymer resin core were spun as described in Example 1. The sheath core fibers were woven into a unidirectional fabric with a plain weave. The count of the fabric was 5×35.6, its width was 18$^3$⁄$_{16}$ in [46.2 cm] and its weight was 5.913 oz/yd$^2$. The unidirectional fabric was cut along the direction of the fibers to from several fabric ribbons that were 2.5" (6.4 cm) wide and about 18" (46 cm) long. Using the same method as described in Example 1, each ribbon was then manually folded over itself at a recurring distance of 2.25" (5.72 cm) to form pleats. Pleating was carried out along the direction of the fibers. Four such pleated ribbons were stacked on top of each other and compressed and tacked together at 90° C. for 30 minutes under an 8.5 pound weight. This process yielded a preconsolidated plate of density 0.42 g/cm$^3$. Ten such preconsolidated plates were stacked on top of each other and tacked together under a hydraulic press at a temperature of 90° C. and an applied pressure of 60 psi (0.41 MPa). The resulting block had a density of 0.95 g/cm$^3$. The block was trimmed to a dimension of roughly 2.0"×2.0"×2.17" (5.1 cm×5.1 cm×5.51 cm) and further consolidated in a metal mold (as described in Example 1) at a temperature of 95° C. and a pressure of 1000 psi (6.9 MPa). The resulting block had a density of 1.0 g/cm³ and was completely consolidated.

In Examples 1 and 2, partially consolidated fiber ribbon and a unidirectional woven fabric were pleated by hand. Pleating and consolidation can also be done at continuously at much faster speeds using automated machines. In a commercial process, a continuous sheet of preconsolidated fiber beam or unidirectional woven fabric could be continuously fed into a heated zone where the sheet is heated to a desired temperature. The heated sheet can then be taken through a commercial oscillating knife pleating machine such as those manufactured by JCEM GmbH of Switzerland. The machine will create pleats in the sheet of desired amplitude. The pleated sheet could then we sent through a heated stuffer box where individual pleats would be pushed against the preceding pleat with desired force. The elevated temperature and pressure in the stuffer box will enable to tack together to form a solid sheet structure where the fibers run perpendicular to the plane of the sheet and the sheet thickness is equal to the amplitude of the pleats. The solid may then be cut into desired shapes, which can then be further consolidated at elevated temperature and pressure to form FOE billets for skiving.

Example 3

Pleating and Consolidating a Unidirectional Fabric on an Automated Pleating Machine The unidirectional fabric described in Example 2 was fed to an automated oscillating knife pleating machine. The pleating speed was set at 30 pleats a minute and pleat height was set at 0.5" (1.27 cm). The resulting pleats were continuously bonded to their nearest neighbor on the same machine. The temperature for bonding was 80° C. and the applied pressure was 30 psi. The resulting consolidated structure was 18" wide and 0.5", thick.

Example 4

Production of a Continuous Membrane by Rotary Skiving of Fused Trapezoidal Sections The assembly of trapezoids is illustrated in FIGS. 4, 5 and 6. FOE blocks were made as described in Example 1. The blocks were machined into trapezoids using conventional machining techniques. The blocks were machined in a manner that oriented the fibers such that they are perpendicular to the parallel surfaces of the trapezoid. The angled surfaces of the trapezoid were machined at a 60° angle to the parallel surfaces. Each of the trapezoid blocks measured 2 inches (5 cm) along the longest side L (FIG. 4A) and was 2" (5 cm) thick. Six trapezoid blocks are needed for each complete assembly.

Figure 4B:
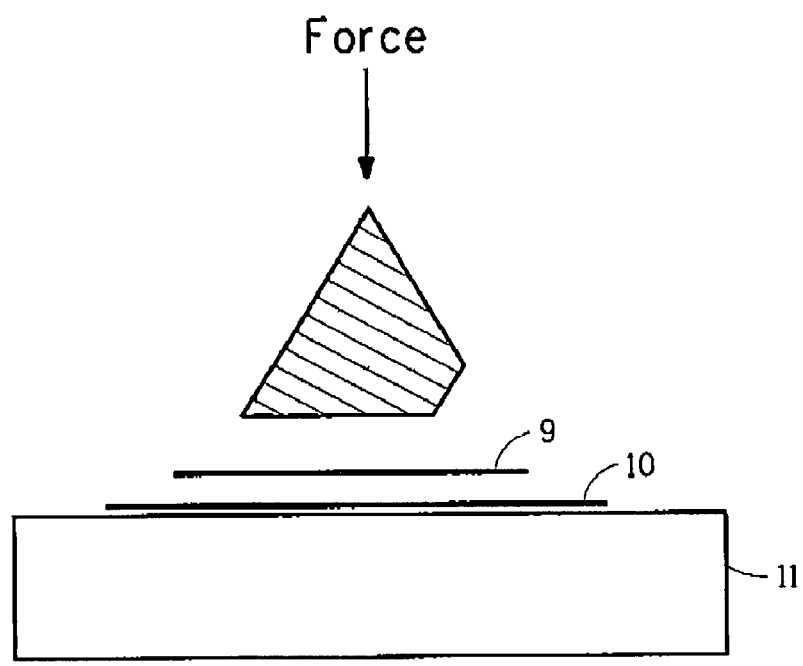

Each block had a capping film bonded to the two angled surfaces. The method for applying the film is shown in FIG. 4B. The capping film 9 was made of 0.005" (127 μm) thick Surlyn® resin film. A hydraulic press with a heated bottom platen was used to bond the films to the block. The bottom platen 11 was heated to 100° C. A sheet of Kapton® polyimide film, 0.005" (127 μm) thick, was placed on the bottom platen to act as a release layer 10. A sheet of the capping film 9 was placed on top of the Kapton® polyimide film and allowed come to temperature, which took approximately 5 seconds. The trapezoid block was placed on the film with one angled surface in contact with the film. The block was pressed down against the film with a force of 600 lb (2.7 kilonewtons), for a bonding pressure of 200 psi (1.4 MPa). This pressure was maintained for 60 seconds. This process was repeated for the other angled surface and for the remaining 5 trapezoids.

Figure 5A:
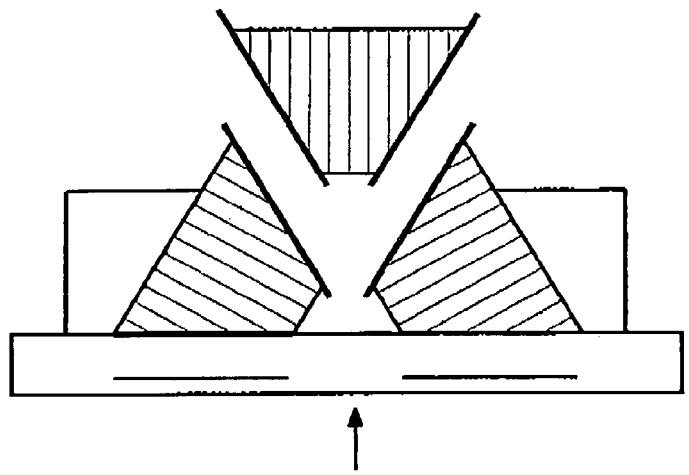
FIGS. 5A-5B are schematic drawings showing the consolidation of three trapezoids into a triplet (5A) and two triplets into a hexagon (5B). The arrows indicate direction of the movement of the mold.
Figure 5B:
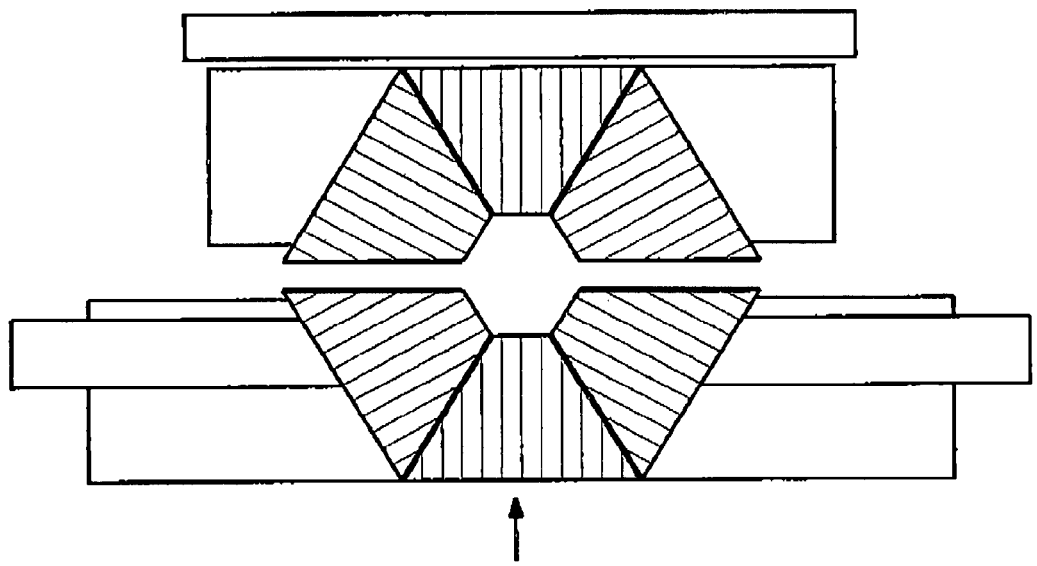

The individual trapezoids were then welded together using a Branson vibration-welding machine, Model Kiefel 240G. This machine has an upper platen that is fixed in the vertical direction and vibrates horizontally. The lower platen moves vertically but is fixed in the horizontal direction. The welding of the trapezoids into a cylindrical billet occurred in two stages. First, three trapezoids were welded together to form a triplet (FIG. 5A). Then two triplets were welded together to form the final billet (FIG. 5B).

To form a triplet, two trapezoids were placed in a specially designed fixture that was fixed to the lower platen. This fixture rigidly clamped the two trapezoids so that they could not move during the welding process. Each trapezoid was oriented with one angled surface horizontal and the other angled surface located such that a third trapezoid can fit snugly between the two trapezoids (FIG. 5A).

Once the trapezoids were clamped firmly into the fixtures, the lower platen rose and placed the trapezoids into contact where they were forced together with 1800 lb of force (8.0 kilonewtons), which resulted in a bonding pressure of 130*psi (0.90 MPa). The upper trapezoid was vibrated at 60 Hz with a 0.070" (1.8 mm) amplitude for 10*seconds (FIG. 5A. Direction of vibration is in and out of the page.), so that the three trapezoids were now welded into a triplet. A second set of trapezoids was welded together following the same process.

The triplets were then welded together using the same vibration-welding machine used to weld the trapezoids. Specially designed fixtures were mounted on the upper and lower platens to hold the triplets firmly during welding. These fixtures held the triplets in such a way that the angled surfaces of each triplet would contact each other when the lower platen rose.

Once the triplets were properly positioned and clamped, the lower platen rose and placed the triplets into contact with each other (FIG. 5B). They were pressed together with 1800 lb (8.0 kilonewtons) of force, which resulted in a bonding pressure of 257 psi (1.77 MPa). The upper triplet was vibrated at 60 Hz with a 0.070" (1.8 mm) amplitude for 13 seconds. The triplets were now welded into a single billet 23 consisting of six trapezoids, each with the fibers oriented in a predominantly radial direction.

Figure 9A:
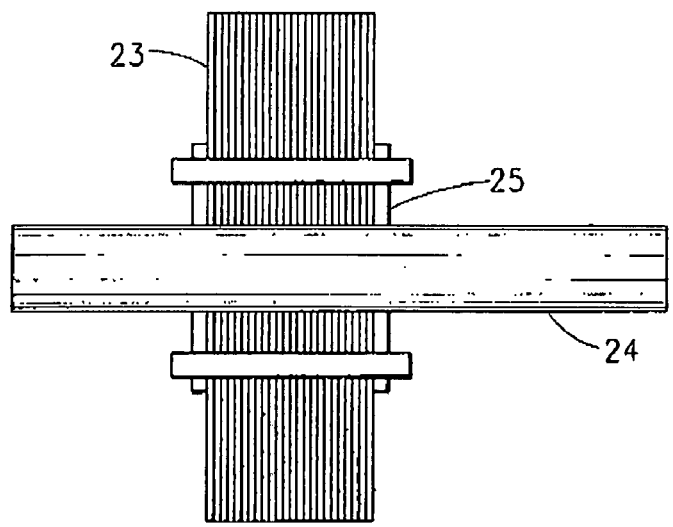
FIGS. 9A-9B are schematic drawings of side (9A) and end-on (9B) views of rotary skiving a billet made by consolidating six trapezoidal sections as shown in FIGS. 5A and 5B.
Figure 9B:
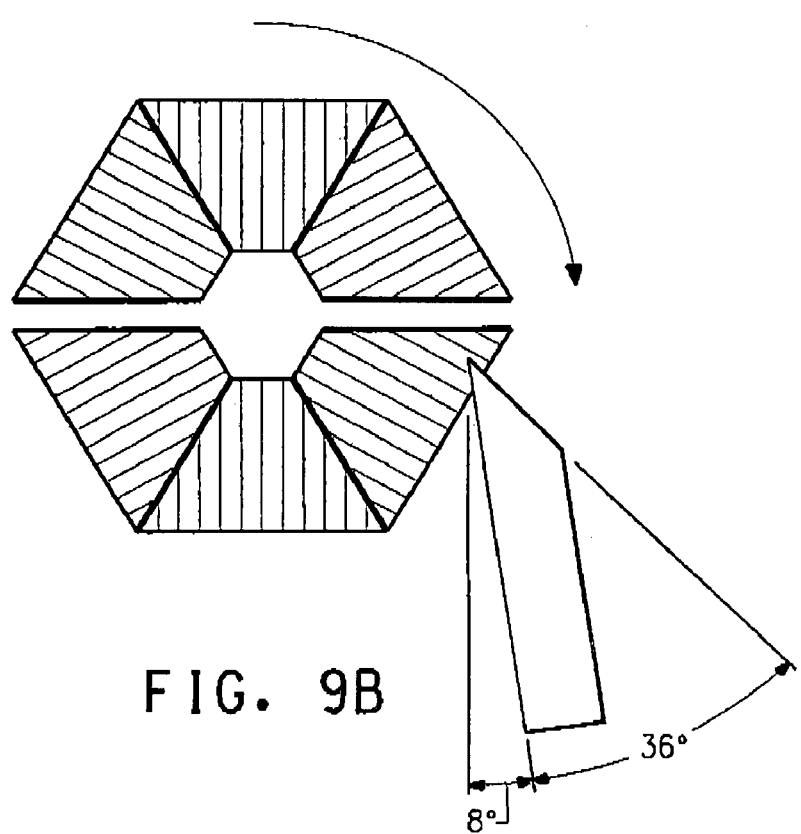

The center of the billet was bored out to 1.0" (2.54 cm) diameter. A specially fabricated spindle 24 was designed that would drive the billet 23 without placing excessive load on the welded joints. The spindle fit snugly in the 1.0" diameter hole and had a plate 25 that bolted onto the billet to drive it (FIG. 9A). The spindle was placed in a standard metal working lathe. A skiving knife was mounted to the tool rest of the lathe. The knife had a tungsten carbide blade sharpened at an angle of 36°. It was mounted with an 8° relief angle (FIG. 9B). The billet was rotated at 17 rpm and the knife was fed in at 0.002" (51 μm) per revolution. This produced a final film thickness of 0.002" (51 μm).

Example 5

Figure 12A:
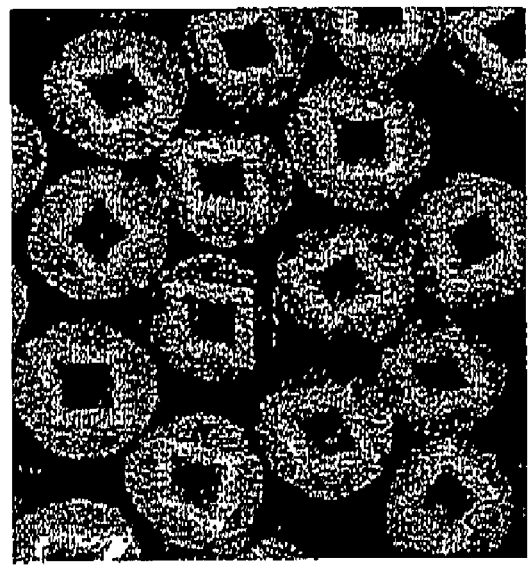
FIGS. 12A-12B depict cross-sections of hollow fibers with inner and outer sheaths (12A) and the fiber-on-end membrane made from them (12B).

This is an example of the formation of a membrane from a hollow fiber with inner and outer sheath, where the outer sheath was thermally fused into a matrix while the inner sheath maintained the hollow shaped pore. This also illustrates that pores can have many cross sectional shapes. The outer sheath of the fiber was Nucrel® 0411HS ethylene copolymer, a thermoplastic ethylene acrylic acid and methacrylic acid copolymer made by DuPont; and the inner sheath was 3.14 IV polycaprolactam, and their ratio was 40/60 respectively. Micrographs of the starting fiber cross sections are shown in FIG. 12A.

Figure 12B:
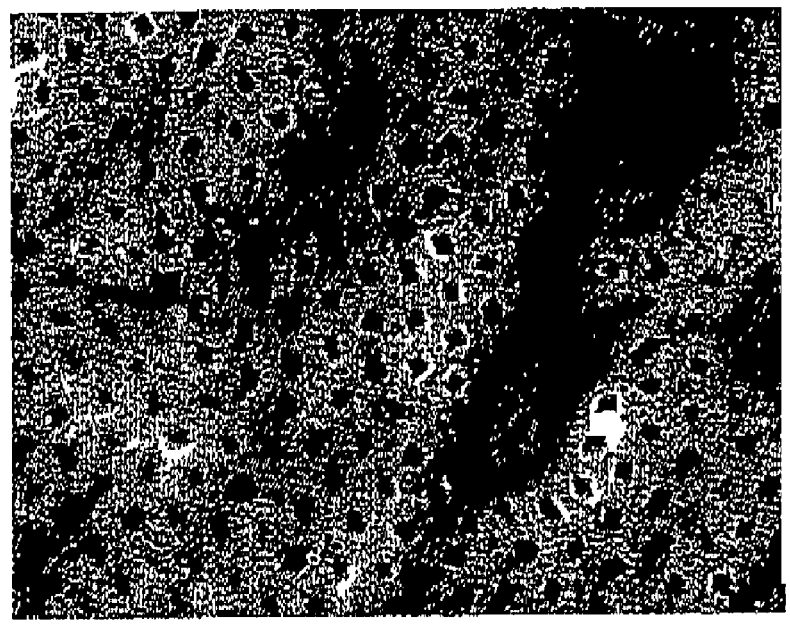

The fibers were wound onto a bobbin at 3500 meters/minute as a ten-fiber yarn of 45 denier. The spinneret was supplied polymer at 255° C. with a concentric sheath-core polymer configuration that passed through an orifice as illustrated in U.S. Pat. No. 5,439,626, FIGS. 6A and 4B. These yarns were then taken from the bobbin and aligned essentially parallel and placed in a rectangular slot and pressed by a bar that was placed in the slot at approximately 120° C. and 780 psi, then cooled into a block. Membranes were skived at approximately ninety degrees to the fiber axis; micrographs are shown in FIG. 12B. The resulting membrane was a flexible membrane with inelastic pores that maintained constant dimension when the membrane was flexed or stretched.

What is claimed is:

1. A process for manufacturing fiber-on-end material, comprising the sequential steps:
    a) providing a consolidated, shaped billet comprising thermally fused fibers on end,
    b) cutting trapezoidal sections from the billet such that the fibers are oriented substantially perpendicular to the base of the trapezoidal section,
    c) welding the trapezoidal sections together to form a billet that is two concentric polygons in cross-section, by: heating in an oven with or without pressure, hot plate welding, vibration welding, or ultrasonic welding,
    d) mounting the billet formed in step c on a spindle,
    e) continuously rotating the billet, and
    f) skiving fiber-on-end material of a desired thickness from the continuously rotating billet.

2. The process of claim 1 further comprising repeating steps b and c to form at least one additional billet, stacking the billets on top of each other, and fusing the billets to form a single billet.

3. The process of claim 1 wherein the trapezoidal sections cut in step b are capped with a polymer film prior to step c.

4. The process of claim 1 wherein the plurality of fibers comprises hollow fibers and the skived material is a porous membrane or a capillary array.

5. The process of claim 1 wherein the plurality of fibers comprises sheath-core or "islands in the sea" fibers.

6. The process of claim 5 further comprising contacting the skived material with a solvent that will dissolve a component of the sheath-core or "islands in the sea" fibers to produce a porous membrane or a capillary array.

7. The process of claim 6 further comprising contacting the membrane with a solvent that will dissolve a component of the sheath-core or "islands in the sea" fibers to produce a membrane with microprojections.

8. The process of claim 1 wherein the plurality of fibers comprises a mixture of fibers of at least two different, defined diameters.

9. A process for manufacturing fiber-on-end material, comprising the sequential steps:
    a) providing a consolidated, shaped billet comprising thermally fused fibers on end,
    b) cutting annular sectors from the billet such that the fibers are oriented substantially perpendicular to the outer arc of the annular sector,
    c) welding the annular sectors together to form a cylindrical billet that is two concentric circles in cross-section, by: heating in an oven with or without pressure, hot plate welding, vibration welding, or ultrasonic welding,
    d) mounting the billet formed in step c on a spindle,
    e) continuously rotating the billet, and
    f) skiving fiber-on-end material of a desired thickness from the continuously rotating billet.

10. The process of claim 9 further comprising repeating steps b and c to form at least one additional billet, stacking the billets on top of each other, and fusing the billets to form a single billet.

11. The process of claim 9 wherein the annular sectors cut in step b are capped with a polymer film prior to step c.

12. The process of claim 9 wherein the plurality of fibers comprises hollow fibers and the skived material is a porous membrane or a capillary array.

13. The process of claim 9 wherein the plurality of fibers comprises sheath-core or "islands in the sea" fibers.

14. The process of claim 13 further comprising contacting the skived material with a solvent that will dissolve a component of the sheath-core or "islands in the sea" fibers to produce a porous membrane or a capillary array.

15. The process of claim 14 further comprising contacting the membrane with a solvent that will dissolve a component of the sheath-core or "islands in the sea" fibers to produce a membrane with microprojections.

16. The process of claim 9 wherein the plurality of fibers comprises a mixture of fibers of at least two different, defined diameters.

* * * * *